US007009791B2

(12) United States Patent
Shimatani

(10) Patent No.: US 7,009,791 B2
(45) Date of Patent: Mar. 7, 2006

(54) POSITION DETECTING METHOD, INFORMATION RECORDING/REPRODUCING DEVICE AND INFORMATION RECORDING MEDIUM

(75) Inventor: Keiji Shimatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 10/774,752

(22) Filed: Feb. 9, 2004

(65) Prior Publication Data
US 2004/0190173 A1 Sep. 30, 2004

Related U.S. Application Data

(63) Continuation of application No. PCT/JP01/06915, filed on Aug. 10, 2001.

(51) Int. Cl.
G11B 5/02 (2006.01)
G11B 5/596 (2006.01)
(52) U.S. Cl. .................. 360/29; 360/77.08; 360/78.14; 360/77.02; 360/77.03; 360/78.04; 369/43; 369/44.11; 369/44.26
(58) Field of Classification Search ............. 360/77.08, 360/29, 78.14, 48, 69, 135; 369/43, 44.11, 369/44.26
See application file for complete search history.

(56) References Cited

U.S. PATENT DOCUMENTS 4,549,232 A * 10/1985 Axmear et al. .......... 360/77.07
6,349,079 B1 * 2/2002 Belser et al. ............ 369/44.26
6,754,016 B1 * 6/2004 Messner et al. .............. 360/48

FOREIGN PATENT DOCUMENTS

| JP | 7-105643 | | 4/1995 |
| JP | 10-83640 | | 3/1998 |
| JP | 10-083640 | * | 3/1998 |
| JP | 2001-110027 | * | 4/2001 |

OTHER PUBLICATIONS

"Disk File Phase-Encoded Sector Servo Pattern with data and Reference Fields in Each Sector"; *IBM Technical Disclosure Bulletin*; vol. 29, No. 8; Jan. 1, 1987; pp. 3697-3699.

* cited by examiner

*Primary Examiner*—David Hudspeth
*Assistant Examiner*—Natalia Figueroa
(74) *Attorney, Agent, or Firm*—Greer, Burns & Crain, Ltd.

(57) ABSTRACT

A position information signal pattern is recorded into a recording medium. The position information signal pattern is configured by arranging graphics having a circular shape, a rectangular shape or the like surrounded by a certain closed curve as pattern elements on a plane, and arranging the pattern elements in circumferential and radial directions of a disc so that a phase and a head position establish a proportional relationship in two or more frequency components of a reproduced signal. Position signals of the two frequency components included in the reproduced signal from the position information signal pattern are obtained, and the two position signals are added up with a certain ratio so that a position signal without error is obtained.

15 Claims, 15 Drawing Sheets

$(k, l, m, n) = (1, 3, 2, -1)$ $(k, l, m, n) = (1, 2, 2, -1)$

POSITION DETECTING METHOD, INFORMATION RECORDING/REPRODUCING DEVICE AND INFORMATION RECORDING MEDIUM

This is a continuation of International PCT Application No. PCT/JP01/06915 filed Aug. 10, 2001.

BACKGROUND OF THE INVENTION

1. Technical Field

The present invention relates to a position detecting method, an information recording/reproducing device and an information recording medium which are used for detecting a head position according to a servo pattern and locating the head at the time of recording/reproducing. Particularly the invention relates to the position detecting method, the information recording/reproducing device and the information recording medium which are used for detecting the head position accurately even if recording shift occurs in the servo pattern.

2. Description of the Related Arts

At the present, in a head locating control method which is called as sector servo used in a magnetic disc device, servo areas where servo information is recorded are radially arranged on a disc with an equal angle. A head is located on a target track based on the servo information. The servo information is composed of track addresses and a servo pattern (position information signal pattern). The track addresses are used for identifying respective tracks. The servo pattern is used for obtaining a quantity of offset from a center of the track of the head.

FIG. 1A illustrates one example of the prior servo pattern, and black-out portions are supposed to be called as pattern elements. The area of the servo pattern is magnetized to a circumferential direction, but a magnetic field of the portions of the pattern elements directs to the opposite direction. The pattern elements whose radial width is about 1 track are arranged with intervals of about 1 track, namely, the pattern elements are arranged with a period of 2 tracks so as to form one burst area. The servo pattern is composted of four burst areas 102A, 102B, 102C and 102D which are shifted by ½ track in a radial direction. When a head 104 is in a position of FIG. 1A, a produced signal of the head in FIG. 1B is obtained. An amplitude of the reproduced signal changes according to a percentage that the head 104 enters the pattern elements. When the head 104 is in a vicinity of a cylinder boundary as shown in the drawing, a difference in the amplitudes of reproduced signals 106A and 106B from the burst areas 102A and 102B is determined as the head position. At this time, reproduced signals 106C and 106D from the burst areas 102C and 102D are zero or in an area where their amplitudes are saturated, and their linearity with respect to the head position is lost. For this reason, the reproduced signals 106C and 106D are not used. When the head is in a vicinity of a cylinder center, a difference in the amplitudes of the reproduced signals 106C and 106D from the burst areas 102C and 102D is determined as the head position. At this time, the reproduced signals 106A and 106D from the burst areas 102A and 102B are not used. A method of detecting the head position in such a manner is called as an amplitude demodulating method.

FIGS. 2A and 2B illustrate another example of the prior servo pattern, and this is called as a phase demodulating method. In the phase demodulating method, a portion, where a plurality of parallel lines are drawn so that phase differences in the circumferential direction and the radial direction is proportional to each other, is one burst area 108A, and a portion where the burst area 108A is inverted axisymmetrically in the circumferential direction, is another burst area 108B as shown in FIG. 2A. In the phase demodulating method, when head positions 110-1 to 110-5 are taken for example, a phase difference between reproduced signals 112A and 112B from the two burst areas 108A and 108B is directly the position of the head in the radial direction.

When the servo pattern is recorded into the disc accurately without a shift, the head position is detected accurately. When the servo pattern is shifted, however, an error occurs in a head position signal to be detected. In the case of the amplitude demodulating method, a shift of the servo pattern in the radial direction appears directly as an error of the head position signal. If the servo pattern is deviated in the circumferential direction, however, the amplitude of the reproduced signals does not change that much, and thus the error does not depend on the shift in the circumferential direction that much. Dispersion of the error in the position signal is approximately inversely proportional to a total sum of circumferential parallel sides of the pattern elements present in an area where the head passes. For this reason, as a number of the pattern elements where the head passes is larger, the condition is better, but only two of the four burst areas can be used for detection of the position signal. For this reason, the usability of the position information signal pattern is not good, and thus this method is wasteful. In the case of the phase demodulating method, the shift of the servo pattern in the radial direction is directly an error of the position signal of the head. Further, the shift in the circumferential direction is also a phase shift of a reproduced signal, and thus becomes an error of the position signal. When a period in the circumferential direction is Px and a period in the radial direction is Py, the shift in the circumferential direction is multiplied by (Py/Px) so as to appear as the error of the position signal. When an inclination is set down so that the lines face the circumferential direction, (Py/Px) becomes small, but as a result, the amplitude of the reproduced signal becomes small, and the error of the position signal is enlarged due to deterioration of SN ratio. For this reason, it is necessary to maintain the inclination to a certain extent or more. The dispersion of the error of the position signal is approximately inversely proportional to a total sum of side lengths of the pattern present in the area where the head passes. Since the signals from the two burst areas are always used, the usability of the position information signal pattern is not waste. The amplitude demodulating method has a problem that the usability of the servo pattern is not good, whereas the phase demodulating method has a problem that the shift of the pattern in the circumferential direction influences accuracy of the position signal.

DISCLOSURE OF THE INVENTION

It is an object of the present invention to provide a position detecting method, an information recording/reproducing device, and an information recording medium which are capable of obtaining a position detected signal of a head without an error even if a shift occurs in a servo pattern recorded into a medium.

A position detecting method for a head being transferred to a radial direction of a medium and recording and reproducing information, characterized by comprising: the step of recording a position information signal pattern (servo pattern) into the medium, the position information signal pattern being configured by arranging graphics surrounded by a certain closed curve as pattern elements uniformly on a plane, arranging the pattern elements in circumferential and radial directions of a disc so that a phase and a head position establish a proportional relationship in two or more frequency components of a reproduced signal; and the step of demodulating a position signal of the head from the reproduced signal of the position information signal pattern. That is to say, in the present invention, since the amplitude demodulation has bad usability of the position information signal pattern, the phase demodulation is used. As to the position information signal pattern, however, the graphics surrounded by not straight line but the certain closed curve are arranged as the pattern elements uniformly on the plane, and the pattern elements are arranged in the circumferential and radial directions of the disc so that the phase and the head position establish the proportional relationship in two or more frequency components of the reproduced signal.

The position information signal pattern is created according to the following procedure:

the graphics surrounded the certain closed curve are used as the pattern elements;

the pattern elements are arranged on the plane with constant intervals in an x axial direction;

one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane;

the plane where the pattern elements are arranged is rotated through an arbitrary angle;

a portion for an arbitrary width determined with respect to the x axial direction is fetched from the plane where the pattern elements are arranged, so as to be a first burst area;

the first burst area is inverted axisymmetrically with respect to the x axis so as to be a second burst area; and the first and second burst areas are arranged so that their x axes match with the circumferential direction of the disc, and their y axes match with the radial direction of the disc.

In the present invention, the position information signal pattern having the periodicity in the circumferential and radial directions simultaneously is desirably recorded. This position information signal pattern is characterized in that:

the graphics surrounded by the certain closed curve are used as the pattern elements;

the pattern elements are arranged on the plane with constant intervals in an x axial direction;

one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane;

when a size of the vector "a" is designated by "a", an angle formed by the vector "a" and the x axis is designated by θ, and an interval of the pattern elements in the x axial direction is designated by b, one of combinations of arbitrary integral numbers (k, 1, m, n) which satisfies $$km \cdot a^2 + (kn+lm) \cdot ab \cdot \cos\theta + ln \cdot b^2 = 0$$

is determined, and α and β are obtained as follows $$\alpha = ka \cdot \cos\theta + lb$$

$$\beta = \sqrt{\{(ka)^2 + 2klab \cdot \cos\theta + (lb)^2\}},$$

when an y axial component of the vector (ka) is positive, $$\phi = \text{Arccos}(\alpha/\beta),$$

when the y axial component of the vector (ka) is negative, $$\phi = -\text{Arccos}(\alpha/\beta),$$

and the plane where the pattern elements are arranged is rotated through the angle −φ in a state that a counterclockwise direction is the positive direction;

a portion for an arbitrary width determined with respect to the x axial direction is fetched from the plane where the pattern elements are arranged, so as to be a first burst area;

the first burst area is inverted axisymmetrically with respect to the x axis so as to be a second burst area; and the first and second burst areas are arranged so that their x axes match with the circumferential direction of the disc and their y axes match with the radial direction of the disc, and thus periodicity is provided to the circumferential and radial directions simultaneously.

In the present invention, the position information signal pattern having the periodicity in the circumferential direction may be recorded. This position information signal pattern is characterized in that:

the graphics surrounded by the certain closed curve are used as the pattern elements;

the pattern elements are arranged on the plane with constant intervals in an x axial direction;

one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane;

when a size of the vector "a" is designated by "a", an angle formed by the vector "a" and the x axis is designated by θ, and an interval of the pattern elements in the x axial direction is designated by b, one of combinations of arbitrary integral numbers (k, 1) is determined, and α and β are obtained as follows $$\alpha = ka \cdot \cos\theta + lb$$

$$\beta = \sqrt{\{(ka)^2 + 2klab \cdot \cos\theta + (lb)^2\}},$$

when an y axial component of the vector (ka) is positive, $$\phi = \text{Arccos}(\alpha/\beta),$$

when the y axial component of the vector (ka) is negative, $$\phi = -\text{Arccos}(\alpha/\beta),$$

and the plane where the pattern elements are arranged is rotated through the angle −φ in a state that a counterclockwise direction is the positive direction;

a portion for an arbitrary width determined with respect to the x axial direction is fetched from the plane where the pattern elements are arranged, so as to be a first burst area;

the first burst area is inverted axisymmetrically with respect to the x axis so as to be a second burst area; and the first and second burst areas are arranged so that their x axes match with the circumferential direction of the disc and their y axes match with the radial direction of the disc, and thus periodicity is provided to the circumferential direction.

Further, in the present invention, the position information signal pattern having the periodicity in the radial direction may be recorded. This position information signal pattern is characterized in that:

the graphics surrounded by the certain closed curve are used as the pattern elements;

the pattern elements are arranged on the plane with constant intervals in an x axial direction;

one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane;

when a size of the vector "a" is designated by a, an angle formed by the vector "a" and the x axis is designated by θ, and an interval of the pattern elements in the x axial direction is designated by b, one of combinations of arbitrary integral numbers (m, n) is determined, and α and β are obtained as follows $$\alpha = ma \cdot \cos\theta + nb$$

$$\beta = \sqrt{\{(ma)^2 + 2mnab \cdot \cos\theta + (nb)^2\}},$$

when an y axial component of the vector (ma) is positive, $$\phi = \mathrm{Arccos}(\alpha/\beta) - 90°,$$

when the y axial component of the vector (ma) is negative, $$\phi = 90° - \mathrm{Arccos}(\alpha/\beta),$$

and the plane where the pattern elements are arranged is rotated through the angle $-\phi$ in a state that a counterclockwise direction is the positive direction;

a portion for an arbitrary width determined with respect to the x axial direction is fetched from the plane where the pattern elements are arranged, so as to be a first burst area;

the first burst area is inverted axisymmetrically with respect to the x axis so as to be a second burst area; and the first and second burst areas are arranged so that their x axes match with the circumferential direction of the disc and their y axes match with the radial direction of the disc, and thus periodicity is provided to the radial direction.

As to the position information signal pattern having the periodicity in the circumferential direction, the width in the x axial direction which is used for fetching the first burst area is integral multiple of β.

The position detecting method of the present invention uses an approximately linear relationship between the two different frequency components in the reproduced signals from the first and the second burst areas which depend on the periodicity in the circumferential or radial direction, and the position of the head in the radial direction, and detects a phase difference between the reproduced signals from the first and the second burst areas so as to obtain position signals of the head in the circumferential direction. Further, the two position signals obtained from the two different frequency components are added up with a ratio determined uniformly by the periodicity of the position information signal pattern so as to be the position signal.

In the position information signal pattern, the position signals obtained in the two frequencies are designated by Pa and Pb. The shifts of the pattern in the circumferential and radial directions are designated by ΔX and ΔY, and the errors of the position signals are designated by ΔPa and ΔPb. When slope in the line group where the position signals are subject to be calculated are designated by −ra and −rb, $$\Delta Pa = -\Delta Y - ra\Delta X$$

$$\Delta Pb = -\Delta Y - rb\Delta X.$$

A new position signal is created as follows:

$$P = kPa + (1-k) \cdot Pb.$$

Variance of an error of this position signal becomes as follows:

$$V(\Delta P) = V(\Delta X)[\{k(ra-rb)+rb\} + E(\Delta X \Delta Y)/V(\Delta X)]^2 + V(\Delta Y) - \{E(\Delta X \Delta Y)\}^2/V(\Delta X).$$

E( ) represents an average, and V( ) represents variance here. When the shifts in the circumferential direction and the radial direction of the servo pattern do not correlate with each other, namely, when $$E(\Delta X \Delta Y) = 0,$$

the coefficient k is set to $$k = rb/(rb-ra)$$

As a result, $$V(\Delta P) = V(\Delta Y)$$

so that the error of the pattern in the circumferential direction can be eliminated by using the two position signals Pa and Pb. As a result, the position signal, which has high usability of the servo pattern and is not influenced by the shift of the pattern in the circumferential direction, can be obtained.

THE BEST MODE FOR CARRYING OUT THE INVENTION

Figure 1A:
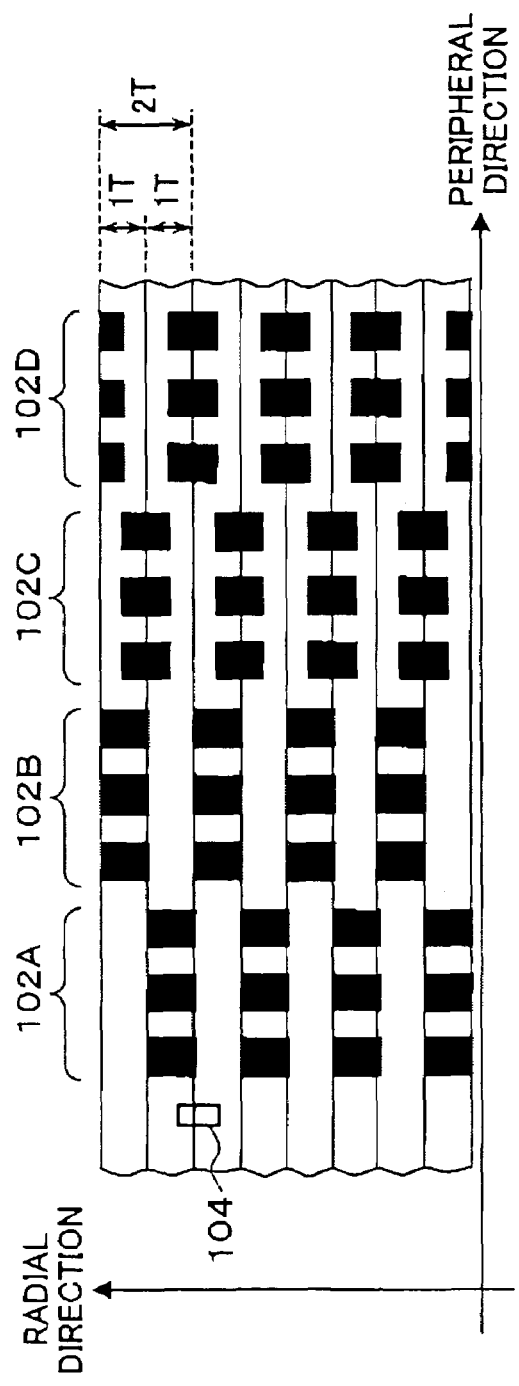
FIGS. 1A and 1B are explanatory diagrams of a servo pattern and a reproduced signal in a prior amplitude demodulating method.
Figure 1B:
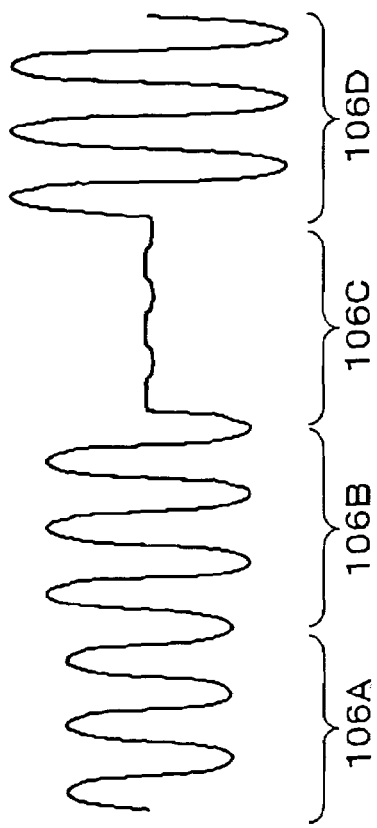
Figure 2A:
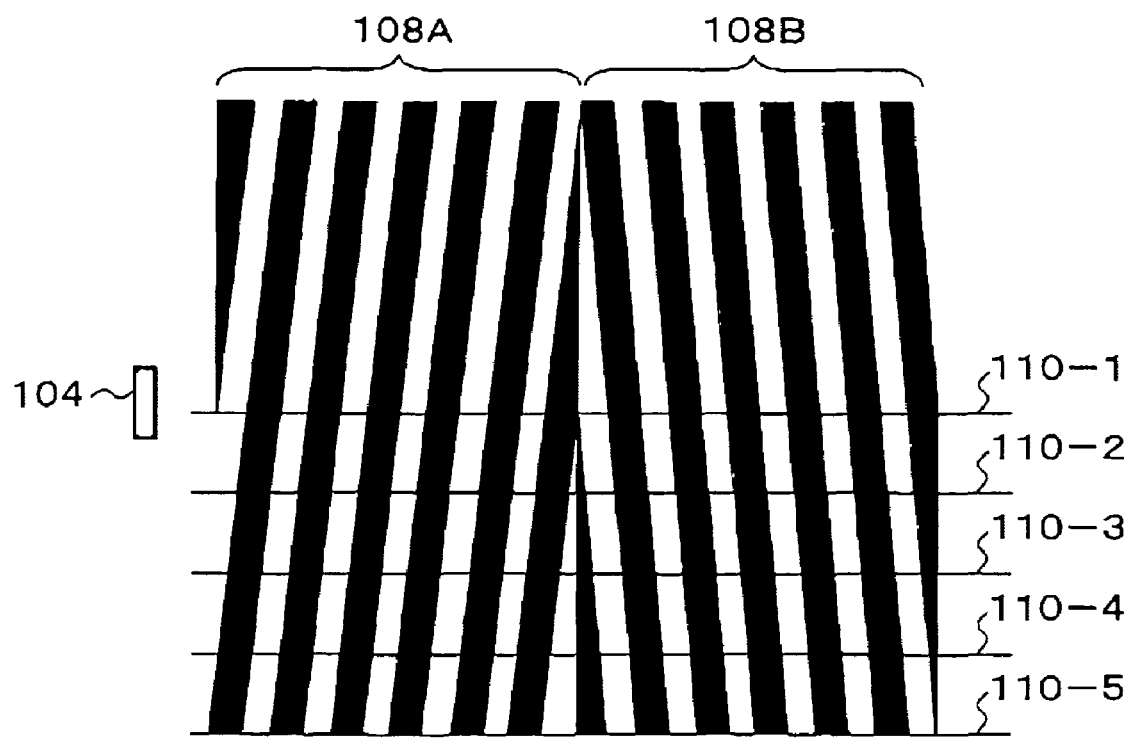
FIGS. 2A and 2B are explanatory diagrams of a servo pattern and a reproduced signal in a prior phase demodulating method.
Figure 2B:
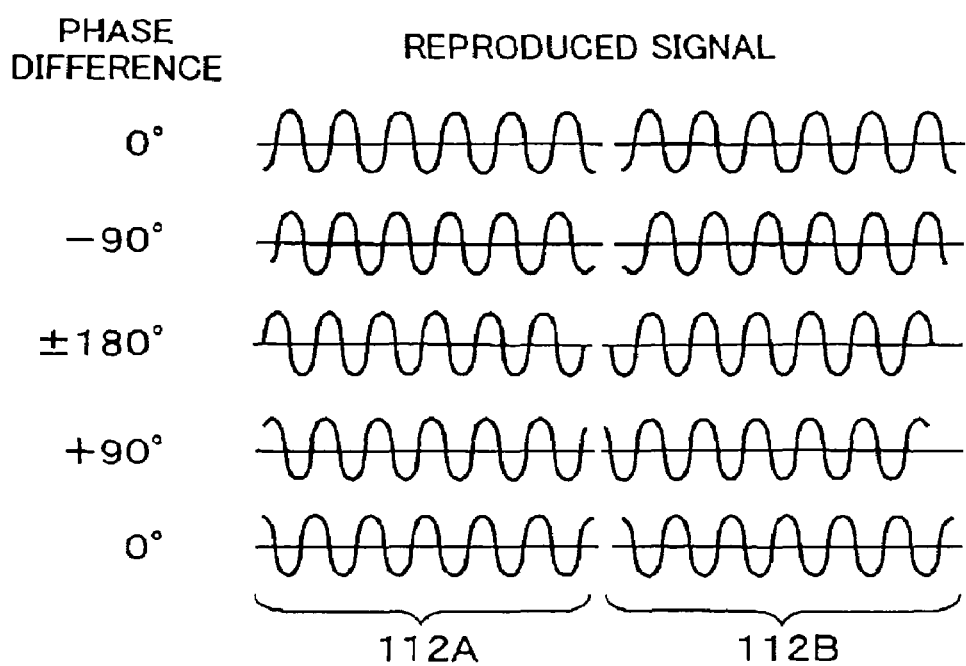
Figure 3:
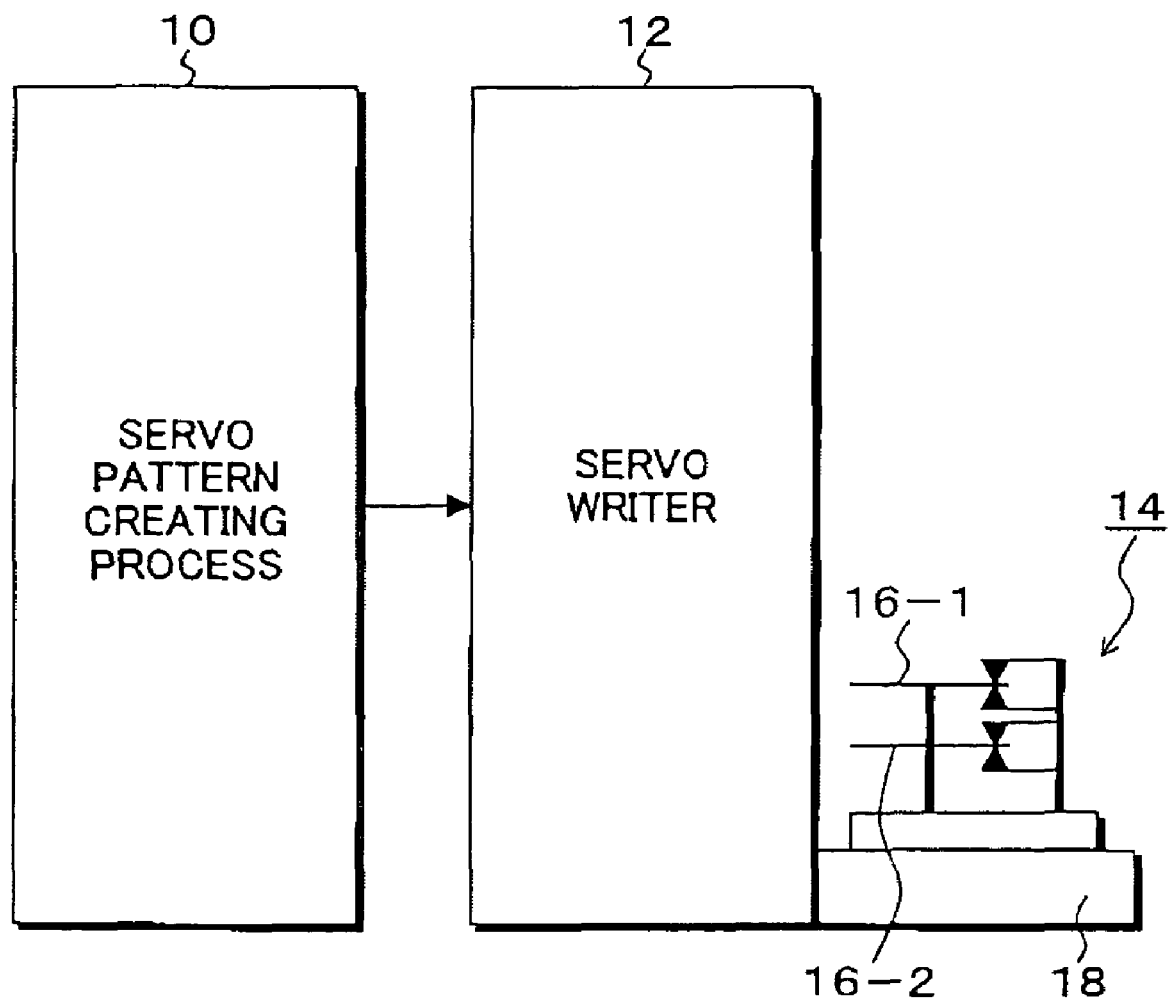
FIG. 3 is an explanatory diagram of servo writer facility for creating a position information signal pattern of the present invention and recording it into a disc.

FIG. 3 is an explanatory diagram of servo writer facility for creating a position information signal pattern of the present invention and recording it into a disc. In FIG. 3, the servo writer facility is composed of a servo pattern creating device 10 and a servo writer 12. The servo pattern creating device 10 creates a servo pattern of the present invention according to a procedure shown in a flowchart of the servo pattern creating process in FIG. 5. When the servo pattern creating device 10 creates the servo pattern of the present invention, parameters of the pattern creation are set so that various patterns are preset to be stored. A servo pattern to be used is selected as the need arises so as to be supplied to the servo writer 12. The servo writer 12 is provided with a head 18, and an HDD assembly 14 is set on the head 18. The servo writer 12 writes servo pattern of the present invention provided from the servo pattern creating device 10 into discs 16-1 and 16-2. In the embodiment, the case where the servo pattern is written into the magnetic discs 16-1 and 16-2 by using the head provided in the HDD assembly 14 is taken for example as the servo writer 12. As another servo pattern writing method, the servo writing may be, however, executed in such a manner that the pattern is recorded directly into the discs 16-1 and 16-2 magneto-optically by EB exposure.

Figure 4:
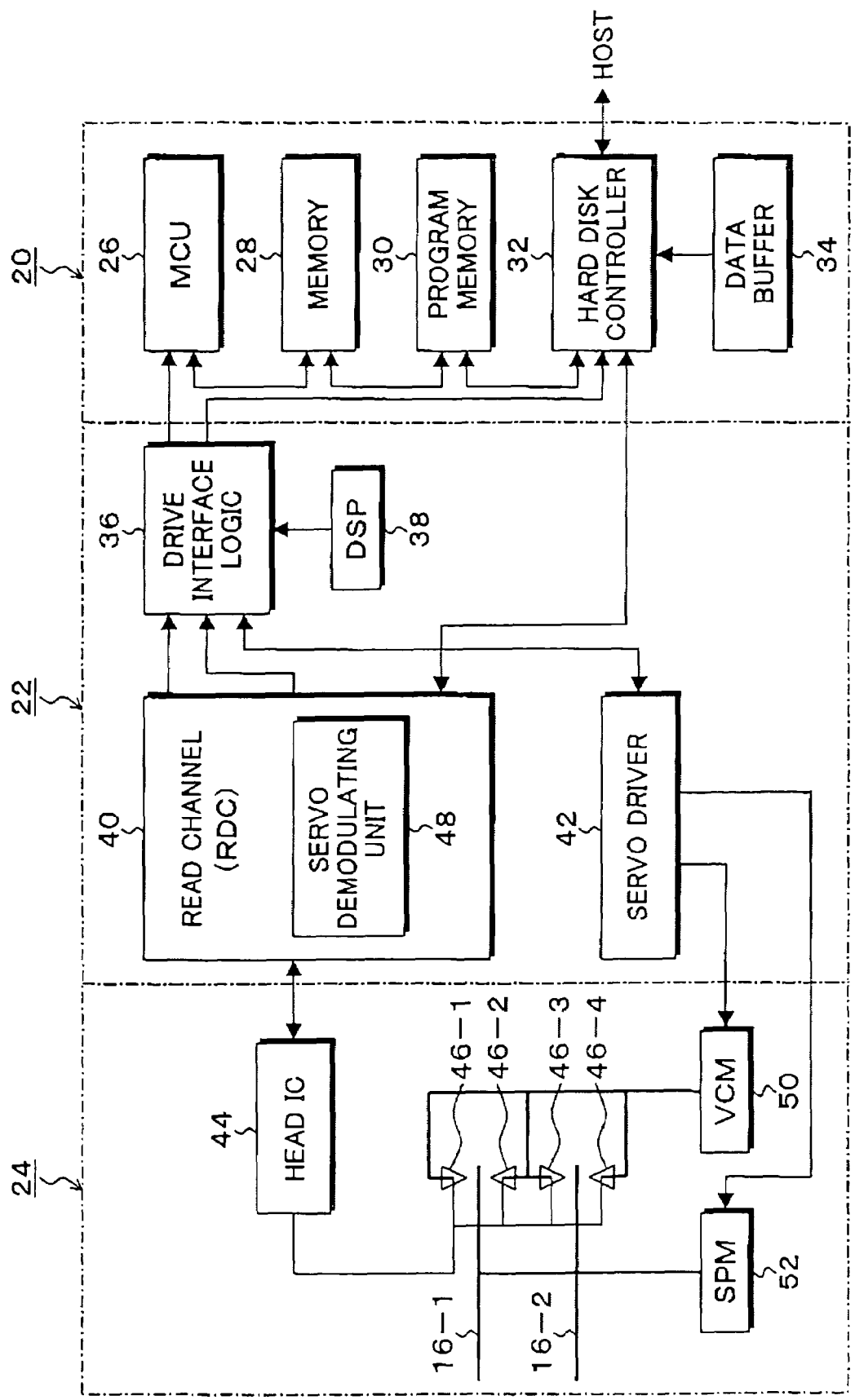
FIG. 4 is a block diagram of a hard disc drive to which the present invention is applied.

FIG. 4 is a block diagram of a hard disc drive to which the present invention is applied. In FIG. 4, the hard disc drive is composed of an SCSI controller 20, a drive control 22, and a disc enclosure 24. An interface with a host is not limited to the SCSI controller 20, and a suitable interface controller can be used. The SCSI controller 20 is provided with an MCU (main control unit) 26, a memory 28 using DRAM or SRAM to be used as control storage, a program memory 30 using an involatile memory such as a flash memory for storing a control program therein, a hard disc controller (HDC) 32, and a data buffer 34. The drive control 22 is provided with a drive interface logic 36, a DSP 38, a read channel (RDC) 40 having a servo demodulating unit 48, and a servo driver 42. The disc enclosure 24 is provided with a head IC 44 and complex heads 46-1 to 46-4 having a write head and a read head are connected with the head IC 44. The complex heads 46-1 to 46-4 are supported by an arm edge of a rotary actuator and are provided on the recording surfaces of the discs 16-1 and 16-2. The complex heads 64-1 to 64-4 are led to arbitrary cylinder positions of the discs 16-1 and 16-2 by driving of the rotary actuator via a VCM 50. The discs 16-1 and 16-2 are rotated at a predetermined speed by a spindle motor (SPM) 52.

Figure 5:
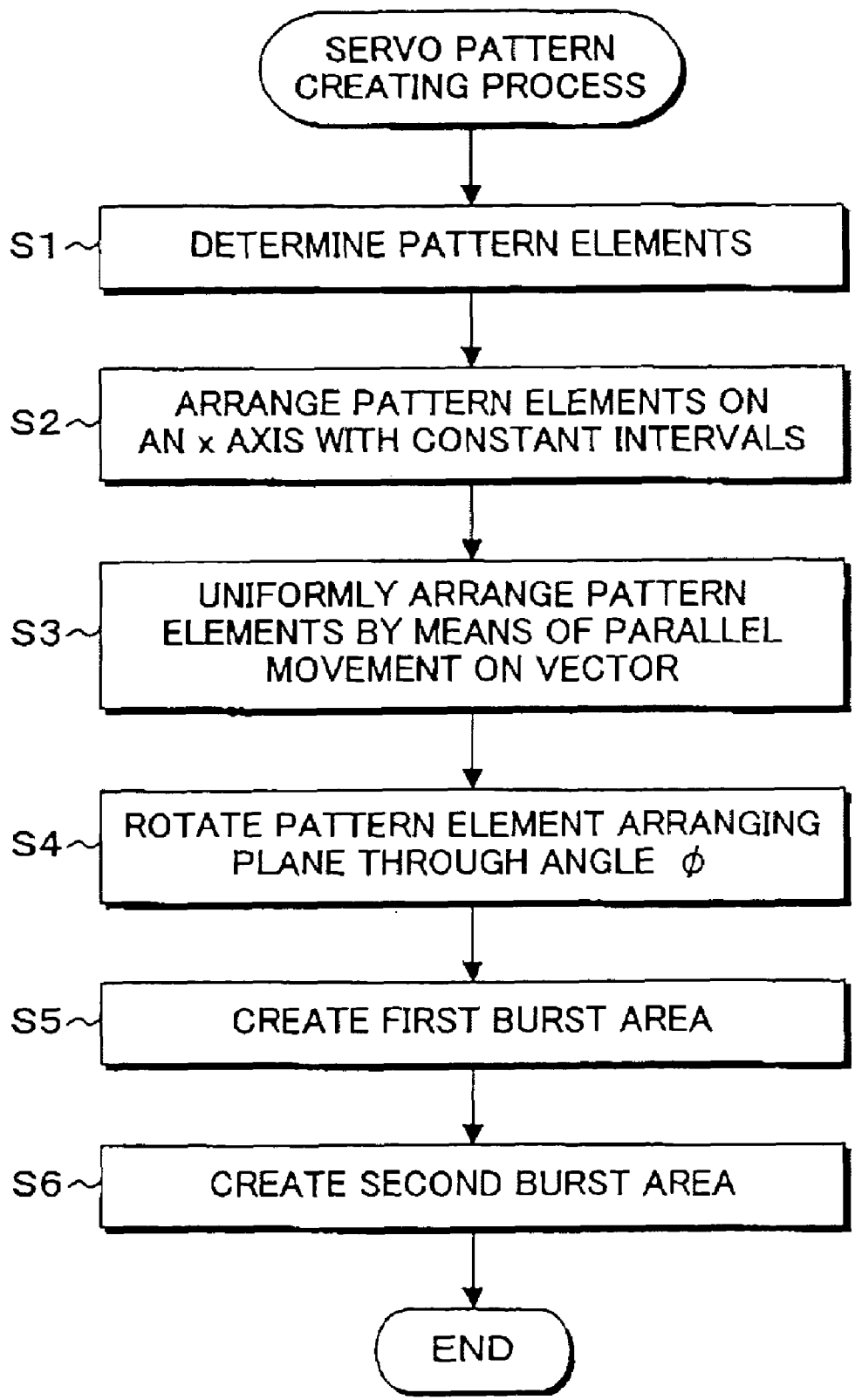
FIG. 5 is a flowchart of a pattern creating process by the servo pattern creating device shown in FIG. 3.
Figure 6A:
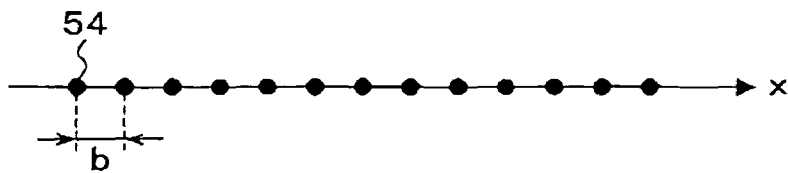
FIGS. 6A to 6G are explanatory diagrams of a procedure for creating the position information signal pattern according to the present invention.
Figure 6B:
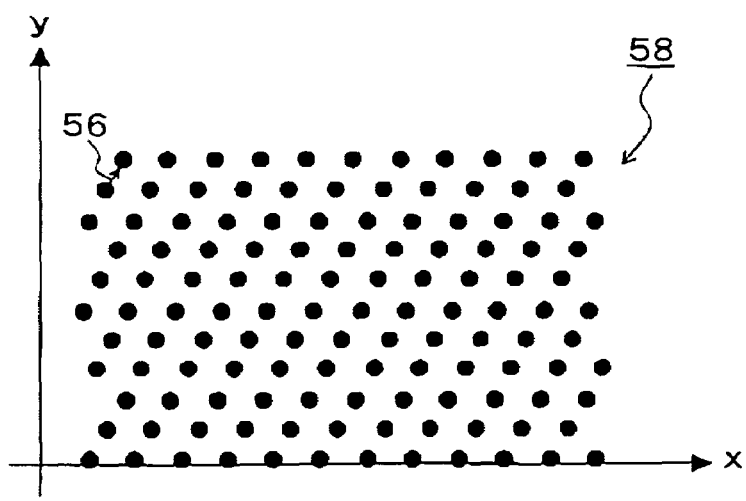
Figure 6C:
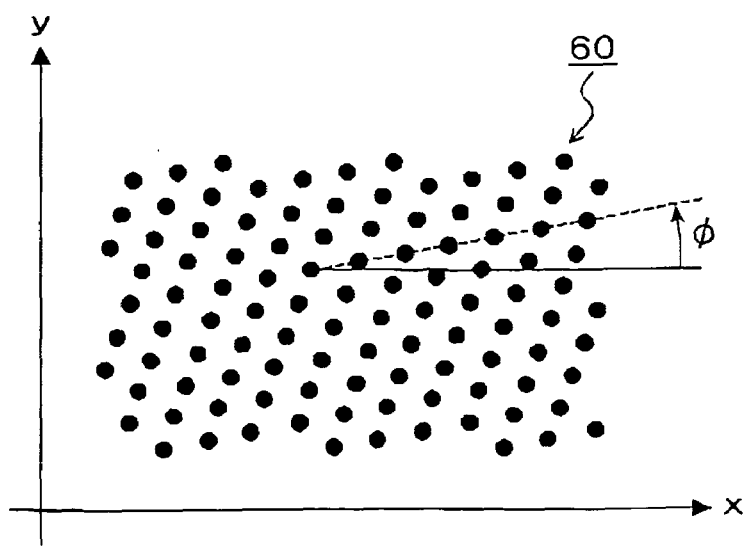
Figure 6D:
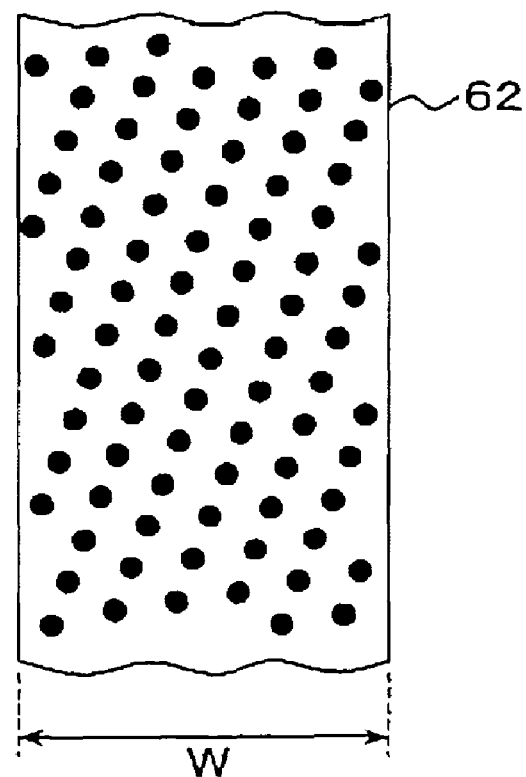
Figure 6E:
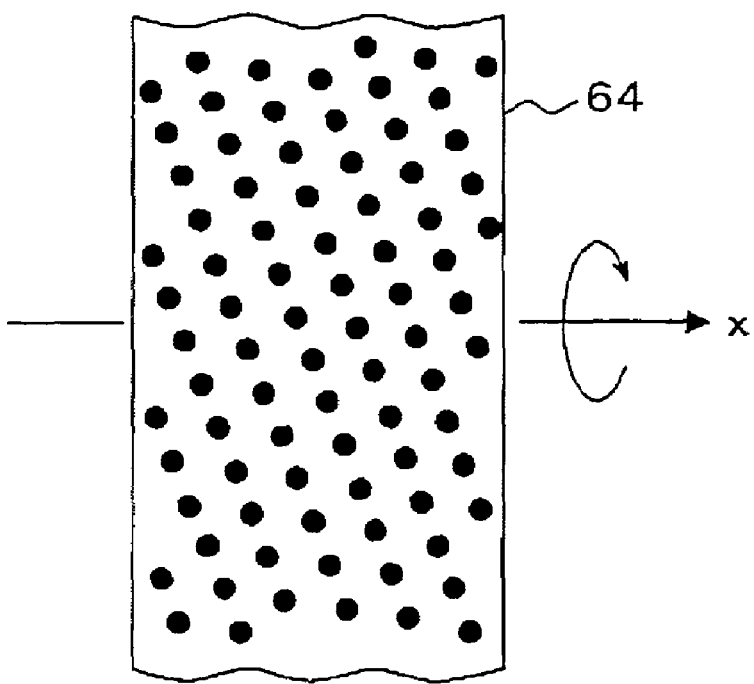
Figure 6F:
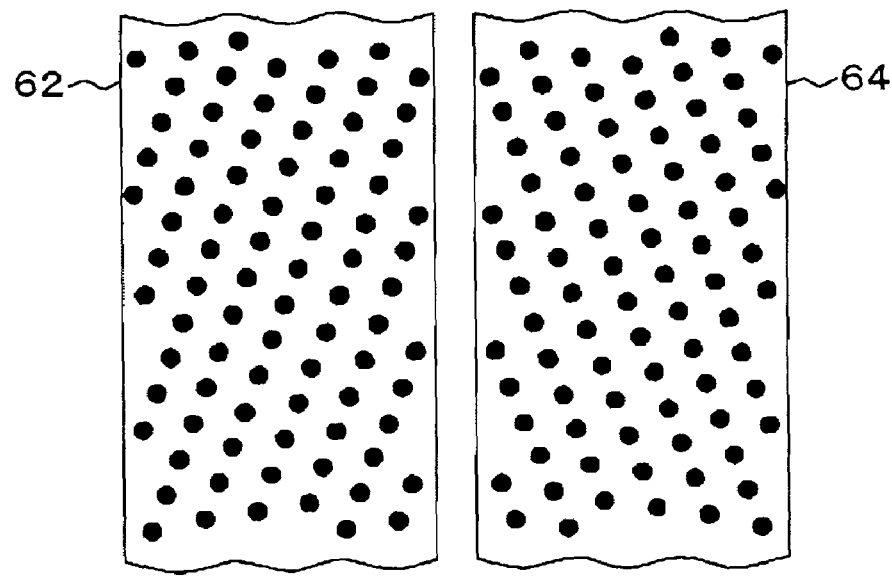
Figure 6G:
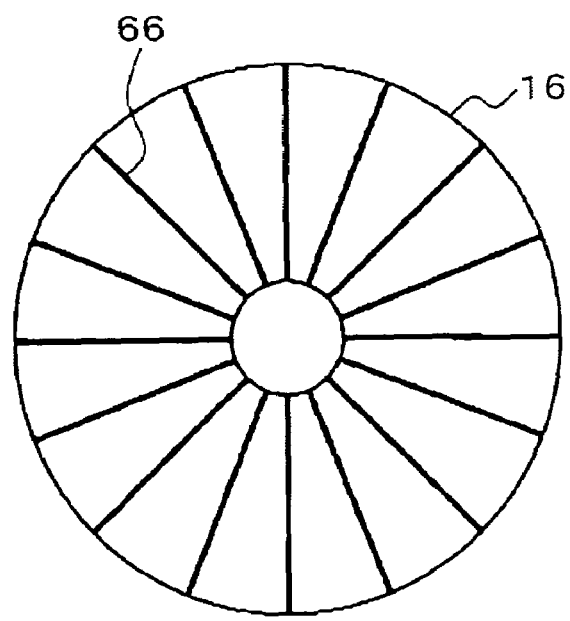

FIG. 5 is a flowchart of the process for creating the servo pattern of the present invention created by the servo pattern creating device 10 in FIG. 3. The servo pattern creating process according to the procedure of steps S1 to S6 is explained below with reference to FIGS. 6A to 8C. Pattern elements to be used for the servo pattern are determined at step S1. In the servo pattern of the present invention, graphics having circular or square shape surrounded not by the prior lines but by a certain closed curve are determined as the pattern elements. For example, a circle is determined as the pattern elements here. The pattern elements are arranged on an x axis on the plane used for the creating process with constant intervals at step S2. FIG. 6A illustrates an example that the circular pattern elements 54 are arranged on the x axis with constant intervals b at step S2. The pattern elements are arranged on the plane uniformly by parallel transfer by a vector at step S3. The process at step S3 is as shown in FIG. 6B. That is to say, one arbitrary vector 56 which is not parallel with the x axis is determined, and pattern elements are further arranged in a position which is shifted parallel by integral k multiple of the vector 56 with respect to all the pattern elements arranged on the x axis. This process is repeated, so that a pattern element arranged plane 58 in which the pattern elements are arranged uniformly on the plane is formed as shown in the drawing. A pattern element arranged plane 60, which is obtained by rotating the pattern element arranged plane 58 in FIG. 6B through an arbitrary angle ϕ, is formed as shown in FIG. 6C at step 4 in FIG. 5. A first burst area is created at step S5 in FIG. 5. That is to say, as to the pattern element arranged plane 60 in FIG. 6C, one arbitrary width W is determined with respect to the x axis, and the portion of width W is fetched, so as to be the first burst area 62 as shown in FIG. 6D. Finally, a second burst area is created at step S6 in FIG. 5. That is to say, the first burst area 62 in FIG. 6D is inverted axisymmetrically with respect to the x axis as shown in FIG. 6E so as to be the second burst area 64 (FIG. 6F). According to the procedure of steps S1 to 56, the first burst area 62 and the second burst area 64 are arranged so that the x axis matches with a disc circumferential direction and an y axis matches with a disc radial direction. In such a manner, the servo pattern is created, and this is recorded as a servo frame 66 in the radial direction of the disc 16 as shown FIG. 6G. In FIG. 6G, the servo frame 66 is divided into 16 areas in the circumferential direction so as to be arranged on the disc 16. A number of division can be, however, a suitable number of servo frames as the need arises. The servo pattern of the present invention in FIG. 6E recorded in such a manner is formed according to a condition, explained below. As a result, even if a shift occurs on the pattern recorded into the disc in the circumferential direction at the time of recording, the error can be eliminated or suppressed at the time of demodulating a position signal.

Figure 7A:
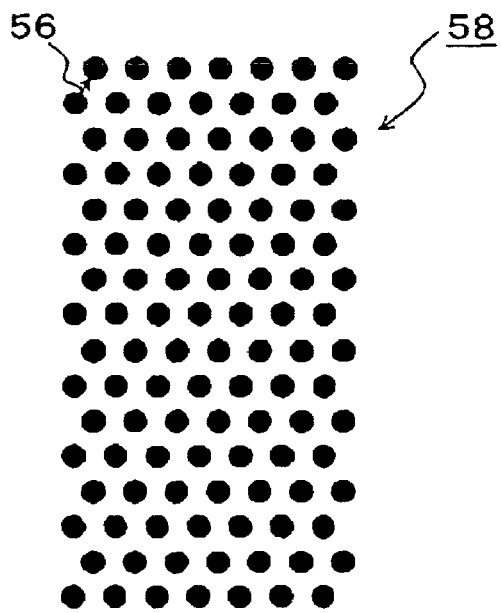
FIGS. 7A and 7B are explanatory diagrams of the procedure for creating the position information signal pattern having periodicity in circumferential and radial directions.
Figure 7B:
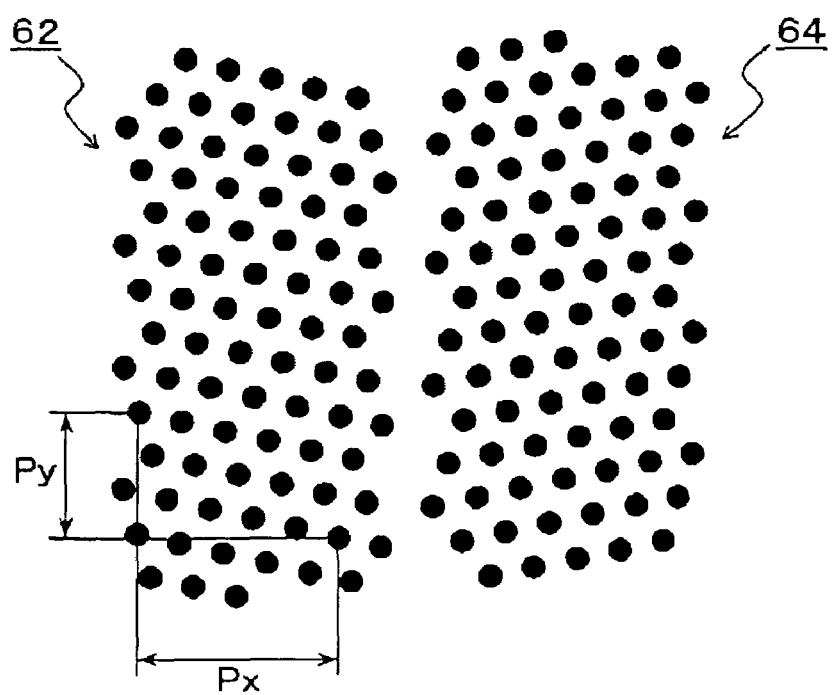

FIG. 7A illustrates the pattern element arranged plane 58 created at step S3 in the servo pattern creating process in FIG. 5. The pattern elements arranged on the pattern element arranged plane 58 with the constant intervals b is rotated through the angle ϕ so that periodicity is provided to the circumferential direction and the radial direction at step S4 in FIG. 5. As a result, the patterns of the first burst area 62 and the second burst area 64 shown in FIG. 7B are formed. The arrangement and the rotation of the pattern elements which give the circumferential period Px and the radial period Py to the patterns of the first burst area 62 and the second burst area 64 are detailed below.

Figure 8A:
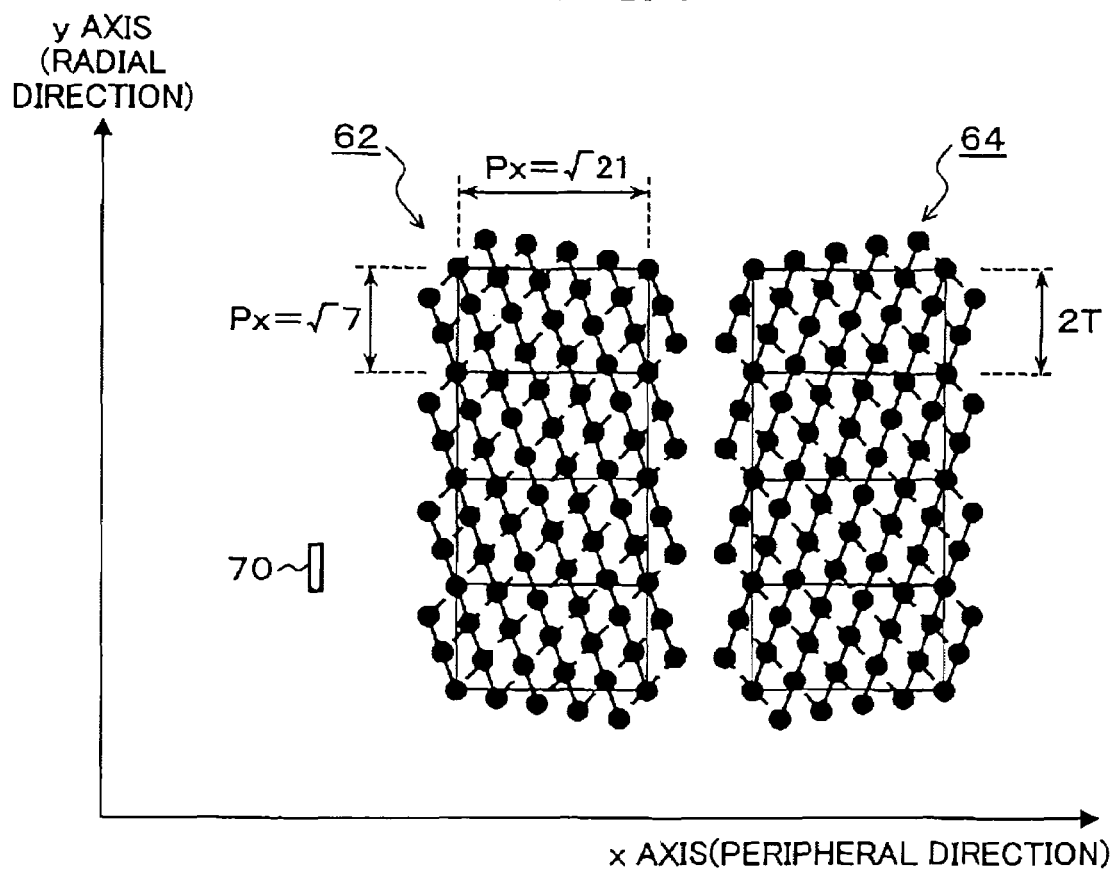
FIGS. 8A to 8C are explanatory diagrams of a periodic structure of the position information pattern in FIGS. 7A and 7B.
Figure 8B:
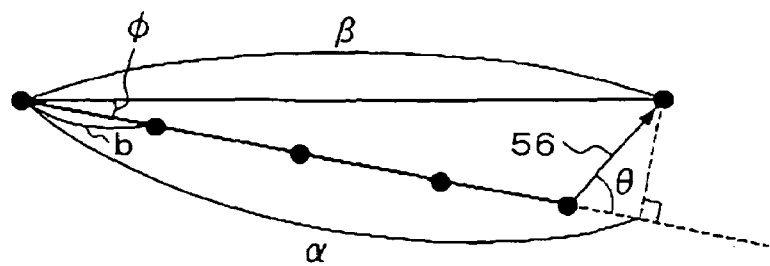

FIG. 8A illustrates the arrangement of the servo patterns in FIG. 7B on the plane in relation with the X axis in the circumferential direction and the Y axis in the radial direction, and their periodicity. FIG. 9B illustrates the case where the arrangement of the pattern elements and the rotation through the angle ϕ in the servo pattern creating procedure in FIG. 10 for one period in the circumferential direction are fetched. When this servo pattern is created, a size of the vector 56 for the parallel travel (a parallel travel distance) is designated by "a", an angle formed by the vector 56 and the x axis before rotation is designated by θ, and an interval of the pattern elements in the x axial direction is designated by b. An integral number k representing integral multiple of the vector 56 and an integral number l representing integral multiple of the interval b are arbitrarily determined, so that α and β in the drawing are obtained by the following equations:

$$\alpha = ka \cdot \cos\theta + 1b \quad (1)$$

$$\beta = \sqrt{\{(ka)^2 + 2klab \cdot \cos\theta + (lb)^2\}} \quad (2)$$

When an y axial component of the vector 56 with a size (ka) is positive, $$\phi = \text{Arccos}(\alpha/\beta) \quad (3)$$

When the Y axial component of the vector 56 with a size (ka) is negative, $$\phi = -\text{Arccos}(\alpha/\beta) \quad (4)$$

A counterclockwise direction on the pattern element arranged plane is a positive direction, and the plane where the pattern elements are arranged is rotated through the angle −φ according to the equation (3) or (4). As a result, the servo pattern of the first burst area 62 in FIG. 10A is obtained. Contrary to the arrangement of the servo pattern which provides the periodicity in the circumferential direction, the pattern providing periodicity in the radial direction is created in the following manner. Similarly to FIG. 8B, a size of the vector 56 is designated by "a", an angle formed by the vector 56 and the x axis before rotation is designated by θ, and the interval of the pattern elements in the x axial direction is designated by b. One of sets of integral number m for giving integral multiple of the interval b and an integral number N for giving the integral multiple of the vector 56 is determined. Similarly, α and β are obtained by the following equations.

$$\alpha = ma \cdot \cos\theta + nb \quad (5)$$

$$\beta = \sqrt{\{(ma)2 + 2mnab \cdot \cos\theta + (nb)2\}} \quad (6)$$

When an y axial component of the vector with size (ma) is positive, $$\phi = \text{Arccos}(\alpha/\beta) - 90 \quad (7)$$

When the y axial component of the vector with size (ma) is negative, $$\phi = 90° - \text{Arccos}(\alpha/\beta) \quad (8)$$

A counterclockwise direction on the pattern arranged plane is a positive direction, and the pattern element arranged plane 58 in FIG. 7A is rotated through the angle −φ according to the equation (7) or (8). As a result, the servo pattern which has the periodicity in the radial direction can be created. In the servo pattern of FIG. 8A, the periodicity is provided simultaneously in the circumferential direction and the radial direction. The servo pattern in this case is arranged in the following manner. A size of the vector is designated by "a", an angle formed by the vector 56 and the x axis before rotation is designated by θ, and the interval of the pattern elements in the x axial direction is designated by b. Arbitrary one of sets of integral numbers (k, l, m, n) which satisfy $$km \cdot a^2 + (kn + lm) \cdot ab \cdot \cos\theta + ln \cdot b^2 = 0 \quad (9)$$

is determined, and α and β in FIG. 10B are obtained by the following equations.

$$\alpha = ka \cdot \cos\theta + 1b \quad (10)$$

$$\beta = \sqrt{\{(ka)^2 + 2klab \cdot \cos\theta + (lb)^2\}} \quad (11)$$

When a y axial component of the vector with size ka is positive, $$\phi = \text{Arccos}(\alpha/\beta) \quad (12)$$

When the y axial component of the vector with size ka is negative, $$\phi = -\text{Arccos}(\alpha/\beta) \quad (13)$$

Figure 8C:
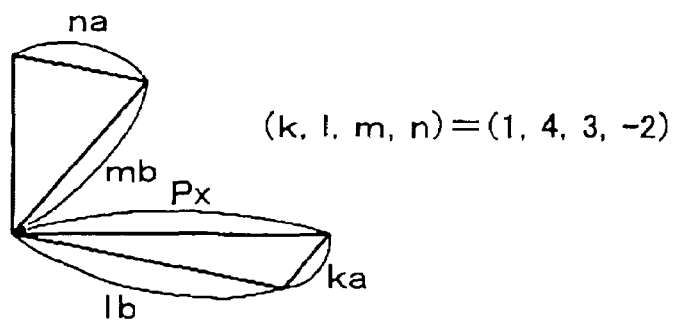

A counterclockwise direction on the pattern element arranged plane is a positive direction, and the pattern element arranged plane 58 in FIG. 7A is rotated through an angle −φ. As a result, the pattern of the first burst area 62 in FIG. 8A is created. The second burst area 64 has a pattern obtained by inverting the first burst area 62 about the x axis. FIG. 8C illustrates a relationship of (ka, lb, mb, na) in the circumferential period Py in the servo pattern of the first burst area 62 of FIG. 10A having the periodicity in the circumferential direction and the radial direction. In the embodiment shown in FIGS. 8A to 8C, the set of the integral numbers (k, l, m, n) which satisfies the condition of the equation (9) is supposed to be as follows:

$$(k, l, m, n) = (1, 4, 3, -2).$$

When the servo patterns of the first burst area 62 and the second burst area 64 in FIG. 8A are viewed, it is found that the first burst area 62, for example, includes right upward sloping phase information represented by a dotted line, and left upward sloping phase information represented by a solid line. When the servo pattern including such two different pieces of the phase information is reproduced by the head 70, the phase and the head position establish a proportional relationship in two or more frequency components in the head reproduced signal. Two pieces of the phase information in the two different frequencies obtained from one pattern are, therefore, added up with a certain ratio, so that a position signal, which has high usability of the pattern of a position information signal and is not influenced by the shift in the circumferential direction, can be obtained. A principle for obtaining such a position signal is explained below. In the servo pattern of FIG. 8A, the position signals obtained with two different frequencies are designated by Pa and Pb. A shift of the servo pattern in the circumferential direction is designated by ΔX, a shift in the radial direction is designated by ΔY, and errors of the position signals Pa and Pb are designated by ΔPa and ΔPb. When an inclination of a group of broken lines in the servo pattern where the position signals are subject to be calculated is designated by −ra and an inclination of a group of solid lines is designated by −rb, the errors ΔPa and ΔPb of the position signals are expressed by the following equations.

$$\Delta Pa = -\Delta Y - ra\Delta X \quad (14)$$

$$\Delta Pb = -\Delta Y - rb\Delta X \quad (15)$$

A signal expressed by the following equation is created as a new position signal P by using a coefficient k.

$$P = kPa + (1-k) \cdot Pa \quad (16)$$

Variance of an error of the position signal P is as follows:

$$V(\Delta P) = V(\Delta X)[\{k(ra-rb) + rb\} + E(\Delta X \Delta Y)/V(\Delta X)]^2 + V(\Delta Y) - \{E(\Delta X \Delta Y)\}^2/V(\Delta X) \quad (17)$$

E( ) represents an average, and V( ) represents variance here. When the shifts in the circumferential direction and the radial direction of the servo pattern do not correlate with each other, namely, when $$E(\Delta X \Delta Y) = 0,$$

the coefficient k is set to $$k = rb/(rb - ra) \quad (18)$$

As a result, $$V(\Delta P)=V(\Delta Y) \quad (19)$$

so that the error of the pattern in the circumferential direction can be eliminated by using the two position signals PA and PB. As a result, the position signal P, which has high usability of the servo pattern and is not influenced by the shift of the pattern in the circumferential direction, can be obtained.

The calculation of the position signal P is concretely explained below with reference to FIG. 8A. The servo pattern of the first burst area 62 in FIG. 8A is obtained in the following manner. A quantity "a" of the parallel travel due to the interval "b" of the pattern elements and the vector are set to be equal with each other (b=a), and the direction of the travel due to the vector of the pattern elements is made to face a direction where angle θ of 60° is formed with respect to the x axis. The pattern elements are arranged uniformly on the plane, and are rotated to a clockwise direction through Arctan ($1/\sqrt{27}$) as the angle φ obtained according to the equation (12). This rotating angle φ corresponds to the case of:

(k, l, m, n)=(1, 4, 3, −2).

When the interval b of the pattern elements is 1 (b=1), the servo pattern of the first burst area 62 in FIG. 8A have the period Px=$\sqrt{21}$ in the circumferential direction and the period Py=$\sqrt{7}$ in the radial direction. Further, the servo pattern has the following periods in the line groups of the dotted lines and the solid lines.

(1) The line group of the dotted lines has the period ($\sqrt{21}/4$) in the circumferential direction and the period ($\sqrt{7}/2$) in the radial direction.

(2) The line group of the solid lines has the period ($\sqrt{21}/5$) in the circumferential direction and the period ($\sqrt{7}/1$) in the radial direction.

For this reason, the servo pattern of the first burst area 62 can be treated as the pattern where two phase patterns composed of the two line groups of the dotted lines and the solid lines having different periods in the circumferential direction and the radial direction are overlapped with each other. The position signal can be detected by a phase demodulating method of demodulating the respective frequency components. An error of the position signal detected from the servo pattern in FIG. 8A is concretely examined. A shift of the servo pattern in the circumferential direction is designated by ΔX, a shift in the radial direction is designated by ΔY, a period of the phase pattern in the circumferential direction is designated by Px, and a period in the radial direction is designated by Py, the error ΔP of the position signal becomes:

$$\Delta P=-\Delta Y-(Py/Px)\Delta X \quad (20)$$

When the shifts of the phase pattern in the circumferential and radial directions are supposed not to correlate with each other, the variance of the position signal becomes:

$$V(\Delta P)=V(\Delta Y)+(Py/Px)^2 \cdot V(\Delta X) \quad (21)$$

When the position signal from the phase pattern in the line group of the dotted lines is designated by P4, the position signal from the phase pattern in the line group of the solid lines is designated by P5, and their errors are designated by ΔP4 and ΔP5, the errors are calculated by the following equations:

$$\Delta P4 = -\Delta Y - ((-\sqrt{7}/2)/(\sqrt{21}/4))\Delta X \quad (22)$$
$$= -\Delta Y + (2/\sqrt{3})\Delta X$$

$$\Delta P5 = -\Delta Y - (\sqrt{7}/(\sqrt{21}/5))\Delta X \quad (23)$$
$$= -\Delta Y - (5/\sqrt{3})\Delta X$$

The two position signals P4 and P5 are added by k: (1−k), so that a new position signal is obtained as follows:

$$P=k\Delta P4+(1-k)P5 \quad (24)$$

An error ΔP of the position signal is expressed by the following equation:

$$P=kP4+(1-k)\Delta P5 \quad (25)$$

When the values of ΔP4 and P5 in the equations (23) and (24) are substituted into the equation (25), the error ΔP is obtained as follows:

$$\Delta P=-\Delta Y-((5-7k)/\sqrt{3})\Delta X \quad (26)$$

The dispersion is, therefore, given by the following equation:

$$V(\Delta P)=V(\Delta Y)+\{5-7k)^2/3\} \cdot V(\Delta X) \quad (27)$$

In the equation (27), in order to make V(ΔP) equal with V(ΔY) (V(ΔP)=V(ΔY)), k is set to 5/7 (k=5/7) because in the equation (27), $$T=Px/Vx$$

Figure 9:
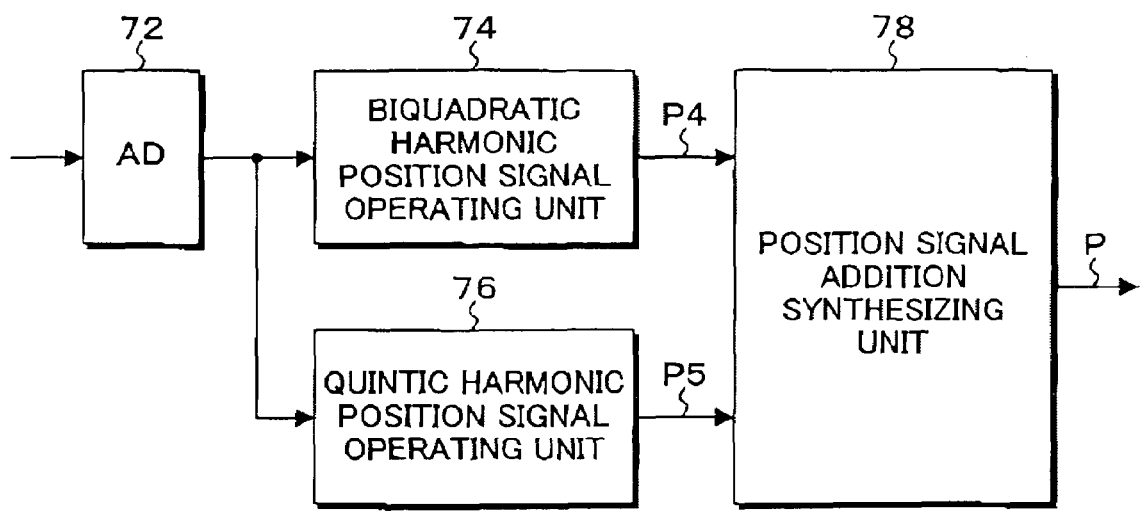
FIG. 9 is a block diagram of a servo demodulating unit of FIG. 4.

FIG. 9 is a block diagram of the servo demodulating unit 48 provided to the hard disc drive in FIG. 4 according to the embodiment. The servo demodulating unit 48 is composted of an AD converter 72, a biquadratic harmonic position signal operating unit 74, a quintic harmonic position signal operating unit 76, and a position signal addition synchronizing unit 78. A reproduced signal of the servo pattern of the present invention obtained from the head is explained below.

Figure 10:
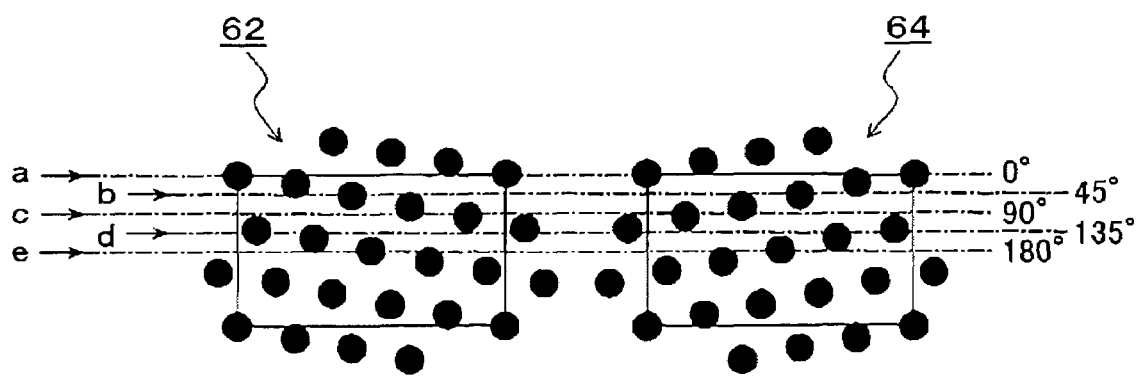
FIG. 10 is an explanatory diagram of a head position with respect to the position information signal pattern in FIG. 9.
Figure 11A:
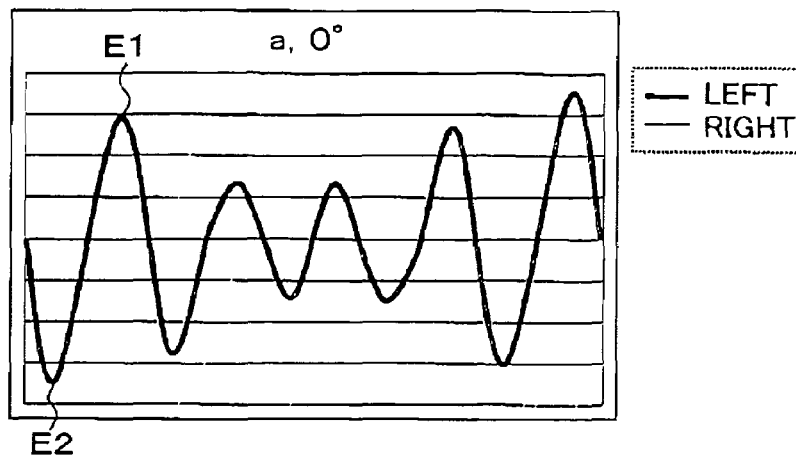
FIGS. 11A to 11E are explanatory diagrams of the reproduced signals from right and left burst areas in the head position of FIG. 10.
Figure 11B:
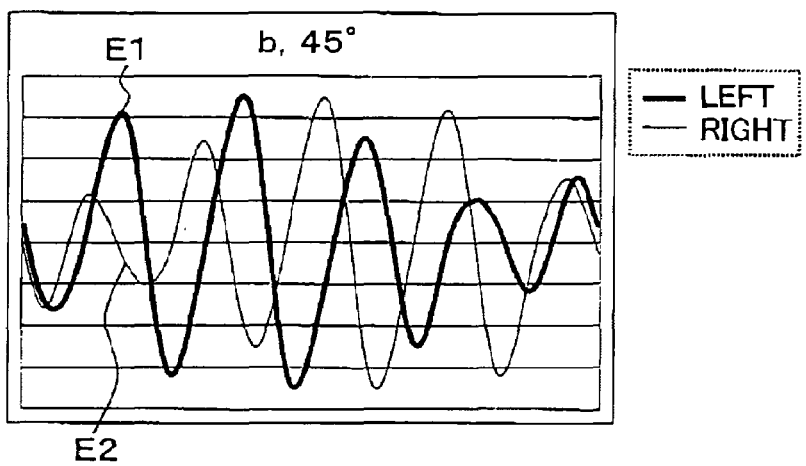
Figure 11C:
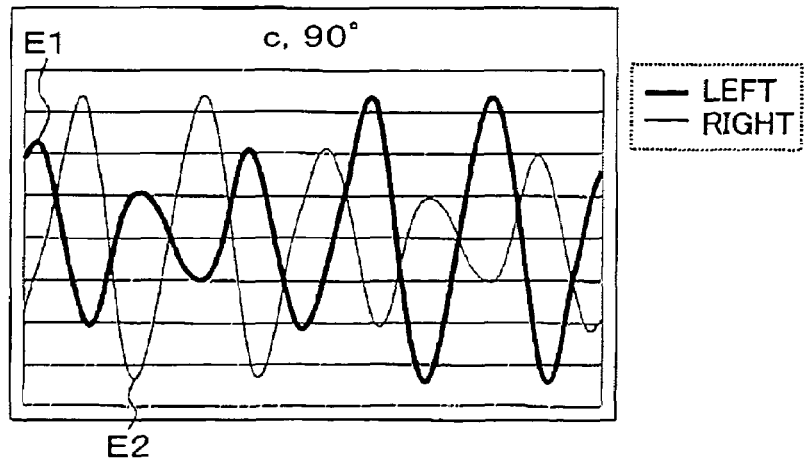
Figure 11D:
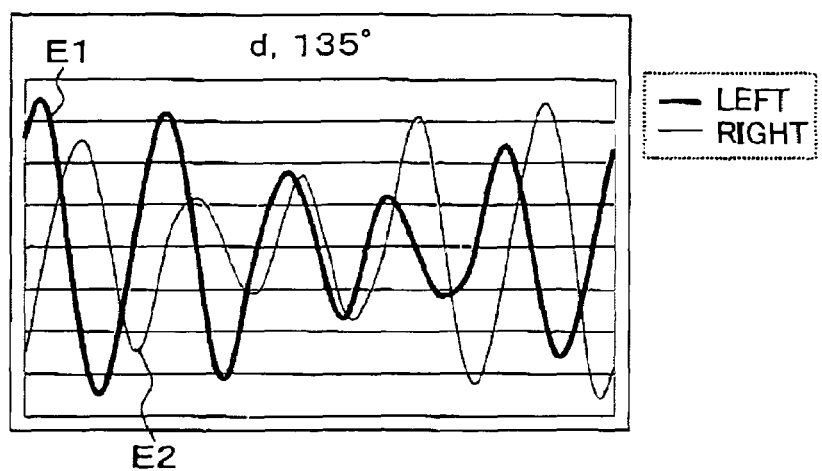
Figure 11E:
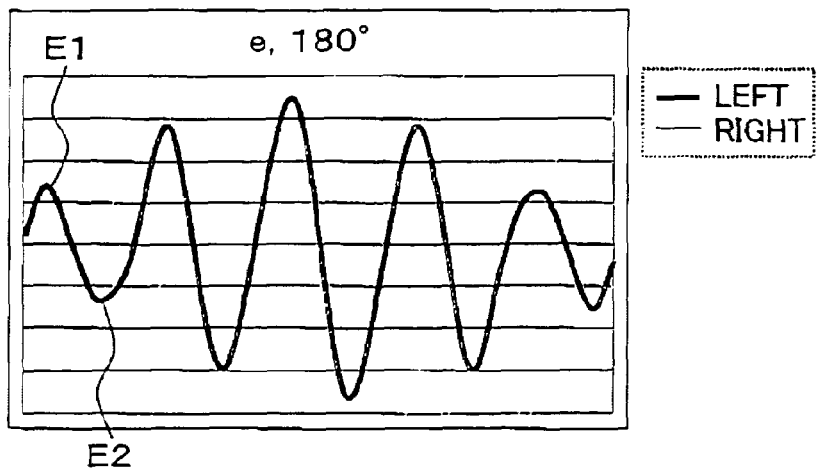

In FIG. 10, the head 70 is moved to positions a, b, c, d, e shown by arrows in areas for a width of 2T on the first burst area 62 and the second burst area 64 in FIG. 8A in the radial direction. The reproduced signals from the first burst area 62 and the second burst area 64 at this time are shown in FIGS. 11A to 11E. When phase of the position "a" is supposed to be 0°, the head positions "a" to "e" are 45°, 90°, 135° and 180°, respectively. FIG. 11A illustrates the reproduced signal E1 of the first burst area 62 and the reproduced signal E2 of the second burst area 64 in the head position "a" of 0°, and the phase difference in this case is 0. FIG. 11B illustrates the reproduced signals E1 and E2 in the head position "b" with phase difference 45°. FIG. 11C illustrates the reproduced signals E1 and E2 in the head position "c" with phase difference 90°, and FIG. 14D illustrates the reproduced signals E1 and E2 in the head position d with phase difference 135°. FIG. 11E illustrates the reproduced signals E1 and E2 in the head position "e" with phase difference 180°. As is clear from these reproduced signals, the reproduced signals E1 and E2 include two different frequency components which depend on the periods of the line groups of the dotted lines and the solid lines.

With reference to FIG. 9, the reproduced signals of the servo pattern obtained from the head are sampled by the AD converter 72 so as to be converted into digital data. The position signal P4 from the phase pattern in the line group of the dotted lines is phase-demodulated by the biquadratic harmonic position signal operating unit 74. The position signal P4 from the phase pattern in the line group of the solid lines is phase-demodulated by the quintic harmonic position signal operating unit 76. The two phases of the phase patterns with different frequencies are demodulated in the following manner. The explanation is given here as to the servo pattern of the first burst area 62 in FIG. 8A. When a peripheral speed of the disc, namely, a relative speed of the head in the circumferential direction with respect to the disc is designated by Vx, a time length T of a reproduced waveform becomes:

$$T=Px/Vx$$

The reproduced waveform of the servo pattern mainly has a biquadratic harmonic component from the line group of the dotted lines with basic frequency 1/T and a quintic harmonic component from the line group of the solid lines. When a number of sampling is N, a sampling interval becomes T/N. The i-th sampled value of the reproduced waveform sig(t) is as follows:

$$sig_i = sig(iT/N)$$

A cos component Ck and a sin component Sk with k-th higher harmonics are, therefore, obtained by the following equations:

$$C_k = \sum_{i=0}^{N-1} \cos\left(\frac{2\pi}{T} k \cdot i \frac{T}{N}\right) \cdot sig_i = \sum_{i=0}^{N-1} \cos\left(\frac{2\pi}{N} ki\right) \cdot sig_i \quad (28)$$

$$S_k = \sum_{i=0}^{N-1} \sin\left(\frac{2\pi}{T} k \cdot i \frac{T}{N}\right) \cdot sig_i = \sum_{i=0}^{N-1} \sin\left(\frac{2\pi}{N} ki\right) \cdot sig_i \quad (29)$$

The phase of the k-th higher harmonics, therefore, becomes as follows:

$$\theta_{L,K} = Tan^{-1}(S_k/C_k) \quad (30)$$

When the calculation is made on the servo pattern of the first burst area 62 in FIG. 10A, the phase to be obtained becomes as follows:

$$\theta_K = (\theta_{L,K} - \theta_{R,K})/2 \quad (31)$$

Since the period of the line group of the dotted line in the radial direction is Py/2, and the slope is positive, as the head travels gradually to the positive direction in the radial direction, the phase becomes smaller. The position signal P4 from a 4th higher harmonics becomes as follows:

$$P_4 = -(P_y/2) \cdot (\theta_4/2\pi) \quad (32)$$

Since the period of the line group of the solid lines in the radial direction is Py and the slope is negative, as the head gradually travels to the positive direction in the radial direction, the phase becomes larger. The position signal P5 from a 5th higher harmonics becomes as follows:

$$P_5 = (P_y) \cdot (\theta_5/2\pi) \quad (33)$$

According to algorithm of the position demodulation, the position signals P4 and P5 are calculated by the biquadratic harmonic position signal operating unit 74 and the quintic harmonic position signal operating unit 76 in FIG. 9. The position signals P4 and P5 are output to the position signal addition synthesizing unit 78. For example, 5/7 is set as the coefficient k in the position signal addition synthesizing unit 78, and the position signal P is obtained by the following equation:

$$P=(5/7)/P4+(2/7)P5$$

and it is output.

In the servo pattern of FIG. 8A, (1, 4, 3, −2) are taken for example as the integral numbers (k, l, m, n) which satisfy the equation (9) for providing the periodicity in the circumferential and radial directions. The inventors of the present application devote themselves to research, the following integral numbers other than the example are obtained.

That is to say, when a=b and θ=60°, (k, l, m, n) include, for example, the followings:

(1, 2, 5, −4);
(1, 3, 7, −5);
(1, 7, 5, −3);
(1, 11, 7, −4);
(3, 2, 7, −8);
(5, 1, 7, −11);
(5, 2, 3, −4);
(6, 1, 8, −13);
(7, 4, 5, −6); and
(7, 3, 10, −9).

Figure 12A:
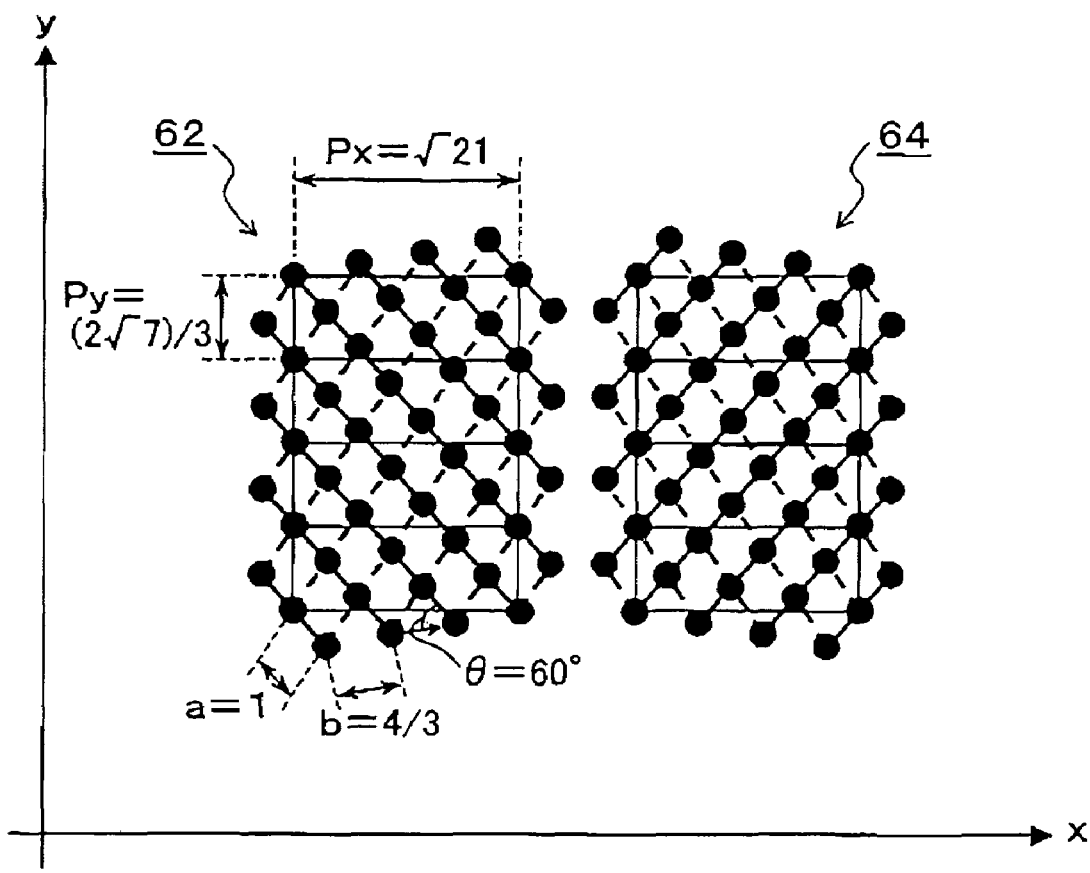
FIGS. 12A and 12B are explanatory diagrams of another embodiment of the position information signal pattern according to the present invention.
Figure 12B:
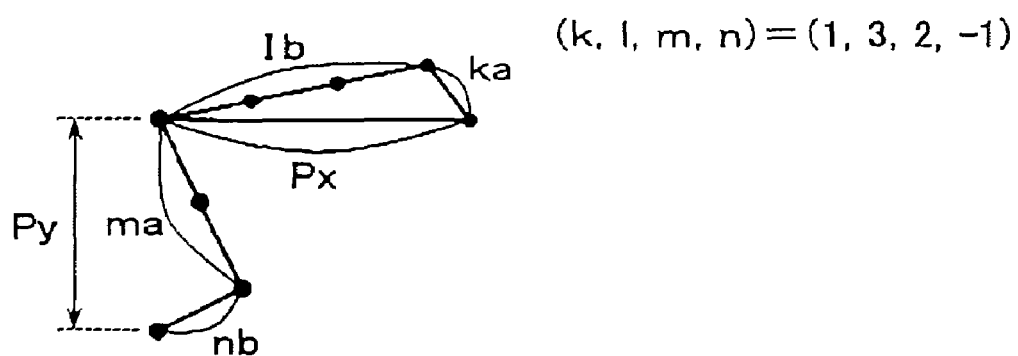

FIGS. 12A and 12B are explanatory diagrams of the servo pattern according to another embodiment of the present invention. In the servo pattern of this embodiment, the pattern elements have a circular shape, and the arrangement interval b of the pattern elements is 4, a quantity "a" of the parallel travel due to the vector is 1, and the direction of the parallel travel due to the vector θ is 60° with respect to the x axis. As the integral numbers (k, l, m, n) which satisfy the condition of the equation (9), (1, 3, 2, −1) are used in this case. The angle φ in this case, therefore, becomes Arctan $(1/\sqrt{27})$ according to the equation (12), and the pattern elements are rotated to the clockwise direction through this angle. The servo pattern in FIG. 12A which is created in such a manner has the period Px of $\sqrt{21}$ in the circumferential direction and the period Py of $(2\sqrt{7})/3$ in the radial direction as illustrated in the first burst area 62. Further, the servo pattern is constituted so that the following two phase patterns are overlapped with each other.

(1) The line group of the broken lines has the period of $(\sqrt{21})/4$ in the circumferential direction and the period of $(2\sqrt{7})/3$ in the radial direction.

(2) The line group of the solid lines has the period of $(\sqrt{21})/3$ in the circumferential direction and the period of $(2\sqrt{7})/3$ in the radial direction.

When the position signal from the phase pattern in the line group of the dotted lines is designated by P4, the position signal from the phase pattern in the line group of the solid lines is designated by P3, and their errors are designated by ΔP4 and ΔP3, respectively, the errors become as follows:

$$\Delta P4 = -\Delta Y - (-2\sqrt{7})/3)/(\sqrt{21}/4) \quad (34)$$
$$= -\Delta Y + (8/3\sqrt{3})\Delta X$$

$$\Delta P3 = -\Delta Y - ((2\sqrt{7})/3)/(\sqrt{21}/4)\Delta X \quad (35)$$
$$= -\Delta Y - (2/\sqrt{3})\Delta X$$

"k" is obtained by the similar calculation to those in the equations (25) to (28) in the case of the servo pattern in FIG. 10A as follows:

$$k=3/7$$

When the position signal is, therefore, obtained as follows:

$$P=(3/7)\cdot P4+(4/7)\cdot P3 \quad (36)$$

the variance obtains the minimum value as follows:

$$V(\Delta P)=V(\Delta Y).$$

When the pattern creating condition is the same as that in FIGS. 15, namely, a=3 and b=4, θ=60°, (k, l, m, n) include, for example, the following numbers:

(2, 1, 7, −6); and (7, 3, 10, −9).

Figure 13A:
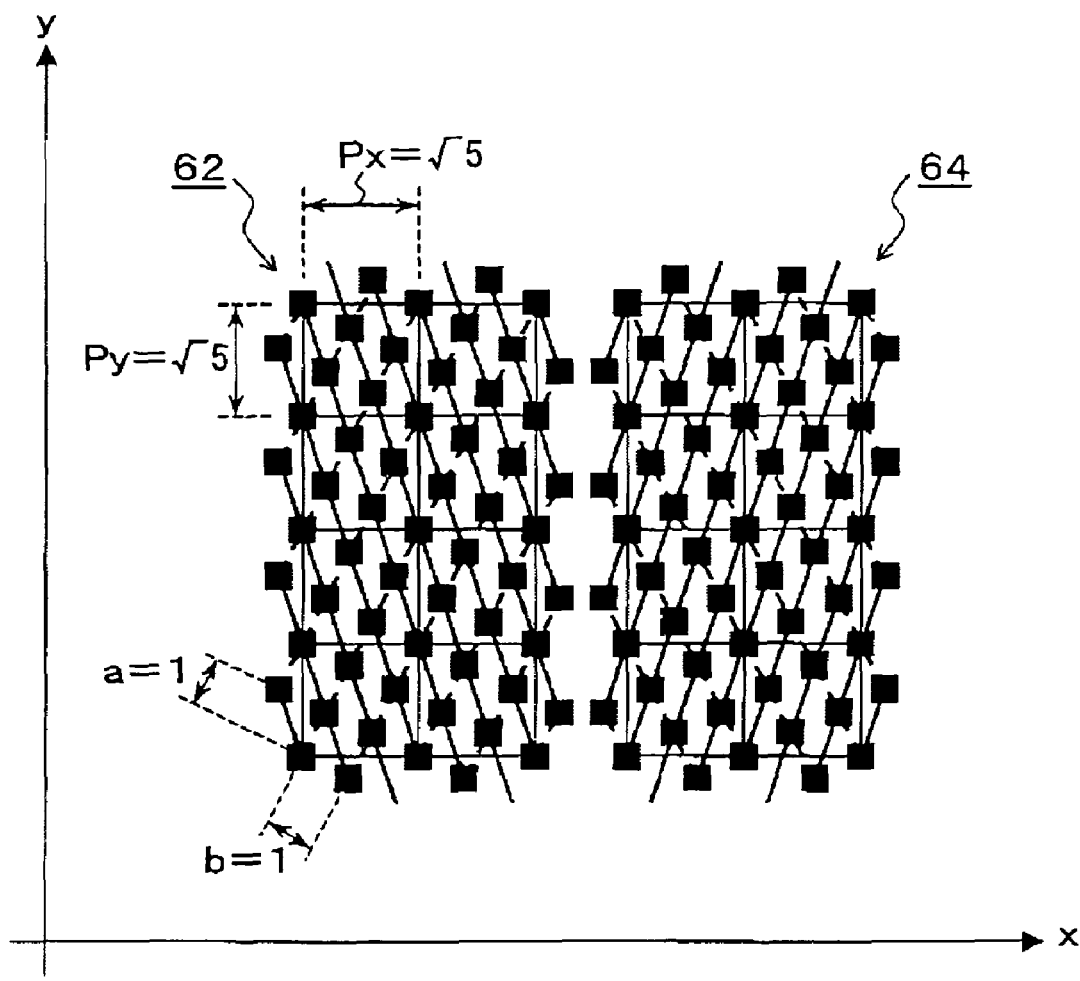
FIGS. 13A and 13B are explanatory diagrams of another embodiments of the position information signal pattern according to the present invention where the pattern elements are rectangular.
Figure 13B:
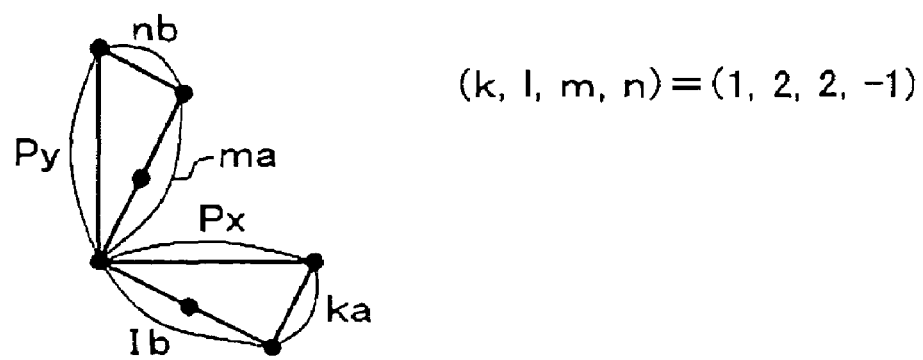

FIGS. 13A and 13B illustrate the servo pattern according to another embodiment of the present invention. This embodiment is characterized in that the pattern elements have a square shape. When the pattern elements have the square shape, the same servo writer as that for the servo pattern used in the current amplitude demodulating method can write the servo pattern, and thus the embodiment is advantageous. In the servo pattern in FIG. 13A, the interval "b" of the pattern elements and the transfer quantity "a" of the vector for transferring the pattern elements in parallel are set to the same values as those in the above-mentioned embodiment. Further, the parallel transfer direction due to the vector is the y axial direction, namely, θ=90°. (1, 2, 2, −1) are used as the integral numbers which satisfy the equation (9), and the angle φ through which the pattern element arranged plane is rotated is set to Arctan (1/2) according to the equation (12). As to the servo pattern in FIG. 13A created in such a manner, both the period Px in the circumferential direction and the period Py in the radial direction are $\sqrt{5}$, and lengths are two periods in the circumferential direction as explained as to the first burst area 62. This servo pattern is configured so that the following two phase patterns are overlapped with each other when the first burst area 62 is taken for example.

(1) The phase pattern in the line group of the dotted lines has the period of $(\sqrt{5})/2$ in the circumferential direction and the period of $\sqrt{5}$ in the radial direction.

(2) The phase pattern in the line group of the solid lines has the period of $(\sqrt{5})/3$ in the circumferential direction and the period $\sqrt{5}$ in the radial direction.

When the position signal of the phase pattern in the line group of the dotted lines is designated by P2, the position signal of the phase pattern in the line group of the solid lines is designated by P3, and their errors are designated by ΔP2 and ΔP3, the errors become as follows:

$$\Delta P2 = -\Delta Y - (-\sqrt{5}/(\sqrt{5}/2))\Delta X \quad (37)$$
$$= -\Delta Y + 2\Delta X$$

$$\Delta P3 = -\Delta Y - (\sqrt{5}/(\sqrt{5}/3))\Delta X \quad (38)$$
$$= -\Delta Y - 3\Delta X$$

k is obtained by the similar calculation as those in the equations (25) to (28) of FIG. 12 as follows:

$$k=3/5.$$

From the position signals P2 and P3 having different phase patterns, therefore, a new position signal P is obtained as follows:

$$P=(3/5)\cdot P2+(2/5)\cdot P3 \quad (39)$$

The variance at this time obtains the minimum value:

$$V(\Delta P)=V(\Delta Y)$$

When the pattern creating condition is the same as that in the embodiment in FIGS. 16, namely, a=b and θ=90°, (k, l, m, n) become (k, 1, 1, −k), and besides (1, 2, 2, −1) of FIG. 15, this combination of the integral numbers includes the followings:

(1, 3, 3, −1);
(1, 4, 4, −1);
(2, 3, 3, −2);
(2, 5, 5, −2);
(3, 4, 4, −3); and
(3, 5, 5, −3).

Further, the servo pattern according to another embodiment of the present invention includes the following cases. For example, a=1, b=k, and θ is arbitrary, the combination (k, 1, k, −1) includes:

when a=2, b=3 and θ is arbitrary, (2, 3, 2, −3); and
when a=3, b=5 and θ is arbitrary, (3, 5, 3, −5).

Further, when a=b, cos θ=−(km+lm)/(kn+lm) (however, k, l, m, n are arbitrary integral numbers which satisfy |km+lm|<|kn+lm|), the combination (k, l,m, n) includes for example:

when cos θ=5/9, (3, 3, 3, −4); and
when cos θ=7/17, (4, 1, 3, −5).

The embodiment of the present invention takes the circular and rectangular pattern elements for example, but a graphic can be used on suitable closed surfaces. As to the pattern elements, the servo writer for the servo pattern according to the current amplitude demodulating method may be used, or the pattern may be recorded by the EB exposure which is now being put to practical use. The present invention includes suitable modifications without deteriorating its object and advantages, and is not limited by the numerical values explained in the above embodiment.

INDUSTRIAL APPLICABILITY

As explained above, according to the present invention, graphics surrounded by the circular or square closed surface are arranged as the pattern elements uniformly on the plane. The patterns are arranged in the circumferential and radial directions of the disc so that the phase and the head position establish the proportional relationship in two or more frequency components of the reproduced signal. As a result, the low usability of the pattern which is the problem in the prior amplitude demodulation is improved, so that high pattern usability is realized. The prior phase demodulation has the problem such that the error of the position signal occurs due to the shift of the pattern. The accurate position detection, with which the error in the position signal due to the shift of the pattern in the circumferential direction does not occur, can be realized in the present invention.

What is claimed is:

1. A position detecting method for a head being transferred to a radial direction of a medium and recording and reproducing information, comprising:
a step of recording a position information signal pattern into the medium, the position information signal pattern being configured by arranging graphics surrounded by a certain closed curve as pattern elements uniformly on a plane, arranging the pattern elements in circumferential and radial directions of a disc so that a phase and a head position establish a proportional relationship in two or more frequency components of a reproduced signal; and a step of determining a position signal of the head by phase-demodulating two or more different frequencies from the reproduced signal of the position information signal pattern, and determining a position signal of the head by adding the position signal resulting from the demodulation at a certain ratio.

2. The position detecting method according to claim 1, wherein the position information signal pattern is recorded in a manner that the graphics surrounded ky the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, the plane where the pattern elements are arranged is rotated through an arbitrary angle, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc.

3. The position detecting method according to claim 1, wherein the position information signal pattern is recorded in a manner that, the graphics surrounded by the certain curve surface are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (k, l, m, n) which satisfies:

$km \cdot a^2 + (kn+lm) \cdot ab \cdot \cos \theta + ln \cdot b^2 = 0$ is determined, and α and β are obtained as follows:

$\alpha = ka \cdot \cos \theta + lb$ $\beta = \sqrt{\{(ka)^2 + 2klab \cdot \cos \theta + (lb)^2\}}$, when an y axial component of the vector (ka) is positive, $\phi = \mathrm{Arccos}(\alpha/\beta)$, when the y axial component of the vector (ka) is negative, $\phi = -\mathrm{Arccos}(\alpha/\beta)$, and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the circumferential and radial directions simultaneously.

4. The position detecting method according to claim 1, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (k, l) is determined, and α and β are obtained as follows:

$\alpha = ka \cdot \cos \theta + lb$ $\beta = \sqrt{\{(ka)^2 + 2klab \cdot \cos \theta + (lb)^2\}}$, when an y axial component of the vector (ka) is positive, $\phi = \mathrm{Arccos}(\alpha/\beta)$, when the y axial component of the vector (ka) is negative, $\phi = -\mathrm{Arccos}(\alpha/\beta)$, and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the circumferential direction.

5. The position detecting method according to claim 1, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the xaxis so as to be arranged uniformly on a recording plane, when a size of the vector "a" is designated by a, an angle formed by the vector "a" and the x axis is designated by θ, and an interval of the pattern elements in the x axial direction is designated by b, one of combinations of arbitrary integral numbers (m, n) is determined, and α and β are obtained as follows:

$$\alpha = ma \cdot \cos\theta + nb$$

$$\beta = \sqrt{\{(ma)^2 + 2nmab \cdot \cos\theta + (nb)^2\}},$$

when an y axial component of the vector (ma) is positive, $$\phi = \text{Arccos}(\alpha/\beta) - 90°,$$

when the y axial component of the vector (ma) is negative, $$\phi = 90° - \text{Arccos}(\alpha/\beta),$$

and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the radial direction.

6. An information recording/reproducing device for transferring a head to a radial direction so as to record and reproduce information, comprising:

a position information signal pattern recorded into a medium, the position information signal pattern configured by arranging graphics surrounded by a certain closed curve as pattern elements uniformly on a plane and arranging the pattern elements in circumferential and radial directions of a disc so that a phase and a head position establish a proportional relationship in two or more frequency components of a reproduced signal; and a position signal demodulating unit for demodulating a position signal of the head by phase-demodulating two or more different freciuencies from the position information signal pattern and for determining a position signal of the head by adding the position signal resulting from the demodulation at a certain ratio.

7. The information recording/reproducing device according to claim 6, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (k, 1, m, n) which satisfies:

$$km \cdot a^2 + (kn+lm) \cdot ab \cdot \cos\theta + lr \cdot b^2 = 0$$

is determined, and α and β are obtained as follows:

$$\alpha = ka \cdot \cos\theta + lb$$

$$\beta = \sqrt{\{(ka)^2 + 2klab \cdot \cos\theta + (lb)^2\}},$$

when an y axial component of the vector (ka) is positive, $$\phi = \text{Arccos}(\alpha/\beta),$$

when the y axial component of the vector (ka) is negative, $$\phi = -\text{Arccos}(\alpha/\beta),$$

and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the circumferential and radial directions simultaneously.

8. The information recording/reproducing device according to claim 6, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, the plane where the pattern elements are arranged is rotated through an arbitrary angle, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc, and their y axes match with the radial direction of the disc.

9. The information recording/reproducing device according to claim 6, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (k, l) is determined, and α and β are obtained as follows:

α=ka·cos θ+lb

β=√{(ka)²+2klab·cos θ+(lb)²}, when an y axial component of the vector (ka) is positive, φ=Arccos(α/β), when the y axial component of the vector (ka) is negative, φ=−Arccos(α/β), and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the circumferential direction.

10. The information recording/reproducing device according to claim 6, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (m, n) is determined, and α and β are obtained as follows:

α=ma·cos θ+nb

β=√{(ma)²+2mnab·cos θ+(nb)²}, when an y axial component of the vector (ma) is positive, φ=Arccos(α/β)−90°, when the y axial component of the vector (ma) is negative, φ=90°−Arccos(α/β), and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the radial direction.

11. An information recording medium for transferring a head to a radial direction so as to record and reproduce information thereinto, wherein the information recording medium records a position information signal pattern, where graphics surrounded by a certain closed curve are arranged as pattern elements uniformly on a plane and the pattern elements are arranged in circumferential and radial directions of a disc so that a phase and a head position establish a proportional relationship in two or more frequency components of a reproduced signal and so that a position signal of the head can be determined by phase-demodulating two or more different frequencies from a reproduced signal of the position information signal pattern and adding the position signal resulting from the demodulation at a certain ratio.

12. The information recording medium according to claim 11, wherein the position information signal pattern is recorded in a manner that the graphics surrounded the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, the plane where the pattern elements are arranged is rotated through an arbitrary angle, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc, and their y axes match with the radial direction of the disc.

13. The information recording medium according to claim 11, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (m, n) is determined, and α and β are obtained as follows:

$$\alpha = ma \cdot \cos\theta + nb$$

$$\beta = \sqrt{\{(ma)^2 + 2mnab\cos\theta + (nb)^2\}},$$

when an y axial component of the vector (ma) is positive, $$\phi = \text{Arccos}(\alpha/\beta) - 90°,$$

when the y axial component of the vector (ma) is negative, $$\phi = 90° - \text{Arccos}(\alpha/\beta),$$

and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the radial direction.

14. The information recording medium according to claim 11, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (k, 1, m, n) which satisfies:

$$km \cdot a^2 + (kn + lm) \cdot ab \cdot \cos\theta + ln \cdot b^2 = 0$$

is determined, and α and β are obtained as follows:

$$\alpha = ka \cdot \cos\theta + lb$$

$$\beta = \sqrt{\{(ka)^2 + 2klab \cdot \cos\theta + (lb)^2\}},$$

when an y axial component of the vector (ka) is positive, $$\phi = \text{Arccos}(\alpha/\beta),$$

when the y axial component of the vector (ka) is negative, $$\phi = -\text{Arccos}(\alpha/\beta),$$

and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus penodicity is provided to the circumferential and radial directions simultaneously.

15. The information recording medium according to claim 11, wherein the position information signal pattern is recorded in a manner that, the graphics surrounded by the certain closed curve are used as the pattern elements, the pattern elements are arranged on the plane with constant intervals in an x axial direction, one arbitrary vector which is not parallel with the x axial direction is determined, and the pattern elements are further arranged on a position which is transferred in parallel by integral multiple of the vector with respect to all the pattern elements arranged on the x axis so as to be arranged uniformly on a recording plane, when a size of the vector "a" is designated by "a", an angle formed by the vector "a" and the x axis is designated by θ, and an interval of the pattern elements in the x axial direction is designated by b, one of combinations of arbitrary integral numbers (k, l) is determined, and α and β are obtained as follows:

$$\alpha = ka \cdot \cos\theta + lb$$

$$\beta = \sqrt{\{(ka)^2 + 2klab \cdot \cos\theta + (lb)^2\}},$$

when an y axial component of the vector (ka) is positive, $$\phi = \text{Arccos}(\alpha/\beta),$$

when the y axial component of the vector (ka) is negative, $$\phi = -\text{Arccos}(\alpha/\beta),$$

and the plane where the pattern elements are arranged is rotated through the angle −φ in a state that a counterclockwise direction is the positive direction, a portion for an arbitrary width determined with respect to the x axial direction is fetched from the plane where the pattern elements are arranged, so as to be a first burst area, the first burst area is inverted axisymmetrically with respect to the x axis so as to be a second burst area, the first and second burst areas are arranged so that their x axes match with the circumferential direction of the disc and their y axes match with the radial direction of the disc, and thus periodicity is provided to the circumferential direction.

* * * * *

UNITED STATES PATENT AND TRADEMARK OFFICE
CERTIFICATE OF CORRECTION

PATENT NO. : 7,009,791 B2 Page 1 of 1
APPLICATION NO. : 10/774752
DATED : March 7, 2006
INVENTOR(S) : Keiji Shimatani It is certified that error appears in the above-identified patent and that said Letters Patent is hereby corrected as shown below:

In the Claims:

Column 17, line 15, delete "surrounded ky" and insert --surrounded by--.

Column 19, line 7, delete "xaxis" and insert --x axis--.

Column 19, line 55, delete "freciuencies" and insert --frequencies--.

Signed and Sealed this

Twenty-fifth Day of July, 2006

JON W. DUDAS
*Director of the United States Patent and Trademark Office*